United States Patent

Suzuki et al.

[11] Patent Number: 6,137,921
[45] Date of Patent: *Oct. 24, 2000

[54] IMAGE PROCESSING APPARATUS AND METHOD FOR PERFORMING IMAGE INCLINATION

[75] Inventors: Takashi Suzuki, Tokyo; Shinobu Arimoto, Yokohama, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/777,091

[22] Filed: Dec. 30, 1996

[30] Foreign Application Priority Data

Jan. 8, 1996 [JP] Japan ..................... 8-000459
Nov. 1, 1996 [JP] Japan ..................... 8-291977

[51] Int. Cl.[7] ................................. G06K 9/32
[52] U.S. Cl. ............................. 382/296; 382/298
[58] Field of Search ..................... 358/540, 451, 358/444, 448, 296; 382/296, 297, 298

[56] References Cited

U.S. PATENT DOCUMENTS 4,788,599  11/1988  Sugishima ..................... 358/296
5,113,252  5/1992   Horie et al. .................... 358/451

FOREIGN PATENT DOCUMENTS 62-232259  10/1987  Japan.
63-199568  8/1988   Japan.

*Primary Examiner*—Thomas D. Lee
*Assistant Examiner*—Stephen Brinich
*Attorney, Agent, or Firm*—Fitzpatrick, Cella, Harper & Scinto

[57] ABSTRACT

An image signal that enters line by line is subjected to italicization processing in a zoom unit. When an input image signal is stored in memory, a controller performs control in such a manner that the write starting address is changed, line by line, in dependence upon angle of italicization (amount of image inclination) and zoom rate.

20 Claims, 29 Drawing Sheets

FIG. 10

| ZOOM RATE M (%) | VALUE IN REGISTER 601 |
|---|---|
| $50 < M \leq 100$ | 0 |
| $33.3 < M \leq 50$ | 1 |
| $25 < M \leq 33.3$ | 2 |
| $20 < M \leq 25$ | 3 |

| CONTROL INPUT | | | Y OUTPUT |
|---|---|---|---|
| a | b | c | |
| 1 | 0 | 0 | A |
| 0 | 1 | 0 | B |
| 0 | 0 | 1 | C |

FIG. 25

| R/E* | AT ENLARGEMENT 0 | AT REDUCTION OR SAME-SIZE COPYING 1 |
|---|---|---|
| M-Adr | R-Adr | W-Adr |
| R-AL | M-LD | RVE* |
| W-AL | WVE* | M-LD |
| RCLD | CLD | REGISTER 2108 |
| WCLD | REGISTER 2109 | CLD |

| R/E* | AT ENLARGEMENT 0 | AT REDUCTION OR SAME-SIZE COPYING 1 |
|---|---|---|
| M-CK | RCK | WCK |
| M-VE | RVE | WVE |

| M (%) | n | X |
|---|---|---|
| 50 < M ≤ 100 | 0 | $8192 \times \left(\frac{100}{M} - 1\right)$ |
| 33 < M ≤ 50 | 1 | $8192 \times \left(\frac{100}{M} - 2\right)$ |
| 25 < M ≤ 33 | 2 | $8192 \times \left(\frac{100}{M} - 3\right)$ |
| 20 < M ≤ 25 | 3 | $8192 \times \left(\frac{100}{M} - 4\right)$ |

F I G. 34

|  | P | P1 | P2 | P3 | Q |
|---|---|---|---|---|---|
| OUTPUT VALUE OF FLIP-FLOP 2207 | 0 | 2048 | 4096 | 6144 | (8192) 0 |
| INTERPOLATION RATE | 0 | 4 | 8 | 12 | 0 |

IMAGE PROCESSING APPARATUS AND METHOD FOR PERFORMING IMAGE INCLINATION

BACKGROUND OF THE INVENTION

This invention relates to an image processing apparatus and method for subjecting an image signal to processing for moving and zooming the image.

Italicization processing for outputting the image of an original upon tilting the image has been proposed for use in an apparatus, such as a digital copier, which electrically processes an image signal obtained by reading the image of the original photoelectrically. The applicant has also proposed such italicization processing, as disclosed in the specifications of Japanese Patent Application Laid-Open Nos. 62-232259 and 63-199568.

The italicization processing described in these disclosures obtains a desired italicized output by changing, in units of one line or a plurality of lines, the readout start timing or address of a memory which stores an image signal entered line by line.

However, in case of a high-speed copier in which the time intervals at which one line of an image is processed are short, the readout start timing or address cannot be changed every line but only every two or three lines. The result is that the output image develops jaggies. Jaggies become particularly pronounced when the image signal is subjected to enlargement processing.

SUMMARY OF THE INVENTION

Accordingly, an object of the present invention is to provide an image processing apparatus and method in which excellent italicization processing is made possible by preventing jaggies caused by italicization processing.

According to the present invention, the foregoing object is attained by providing an image processing apparatus comprising memory means for storing an image signal that enters line by line, and control means for controlling a write starting address, at which an image signal is written to the memory means, when the image signal is stored in the memory means, wherein the image processing apparatus outputs an image that has undergone italicization processing.

Another image processing apparatus according to the present invention comprising memory means for storing an image signal that enters line by line, and control means for controlling a readout starting address, at which an image signal is read out of the memory means, or a write starting address, at which an image signal is written to the memory means, line by line in dependence upon amount of movement and zoom rate of an image, wherein the image processing apparatus outputs an image that has undergone movement and zoom processing.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 is a diagram showing the correspondence between zoom ratio and set values in a register;

FIG. 25 is a block diagram illustrating selection logic of the signal selector (A) shown in FIG. 14;

FIG. 34 is a diagram showing the output value of a flip-flop and interpolation rate concerning each pixel.

DESCRIPTION OF THE PREFERRED EMBODIMENTS

Embodiments of the present invention will now be described in detail with reference to the drawings.

<First Embodiment>

Described as a first embodiment of the invention will be case in which image italicization processing is executed by controlling a write starting address when an image signal entered line by line is stored in a memory.

(Image Processor Architecture)

Figure 1:
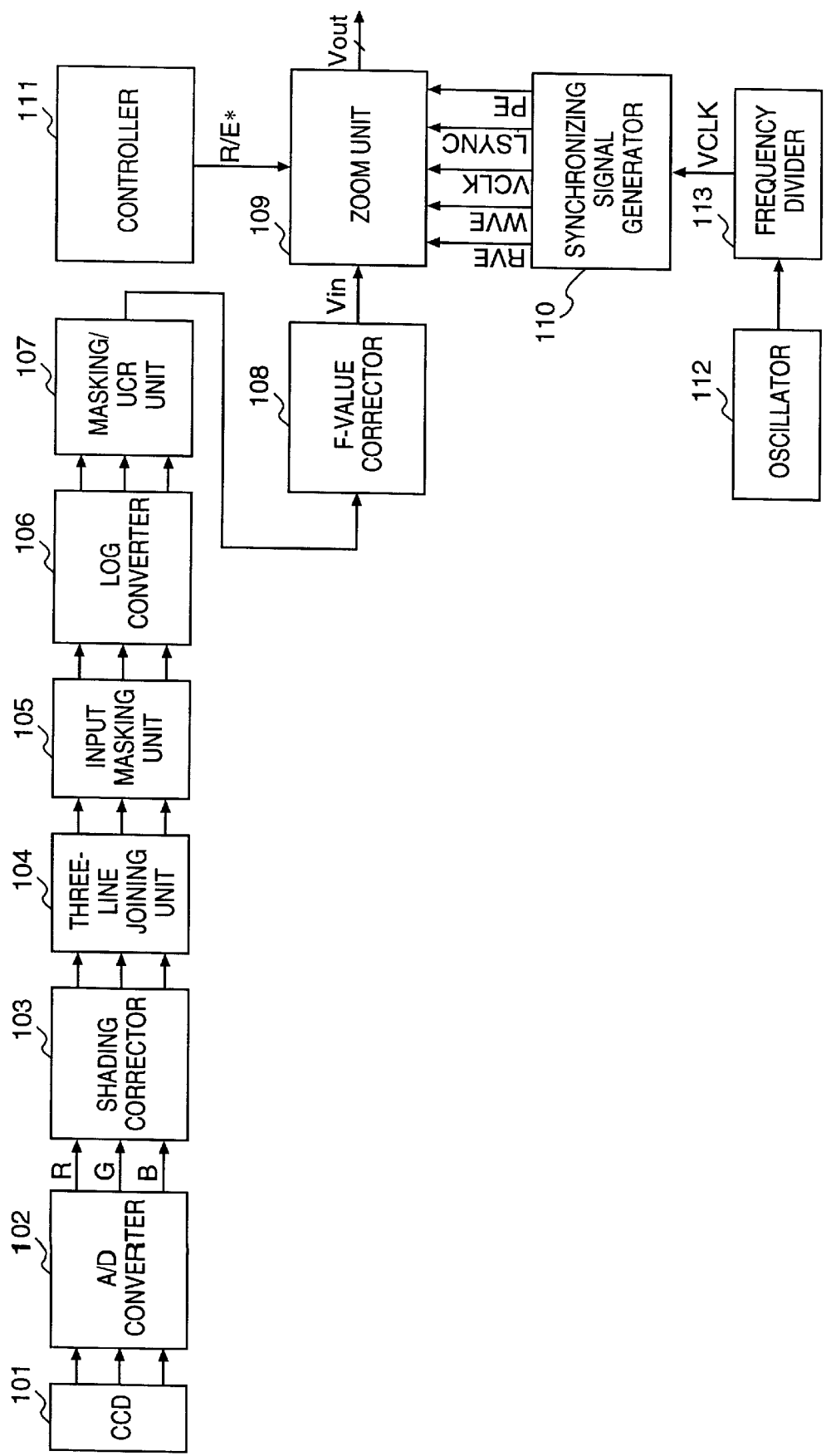
FIG. 1 is a block diagram illustrating the architecture of an image processing apparatus according to a first embodiment of the present invention.

FIG. 1 is a block diagram illustrating the architecture of an image processor in a digital full-color copier.

As shown in FIG. 1, the image processor includes a three-line CCD 101 for separating reflected light from an original document into colors and converting the same to electric signals R, G, B. An A/D converter 102 converts the analog R, G, B signals from the CCD 101 to digital signals. A shading correction unit 103 corrects the sensitivity of each pixel of the CCD 101 and corrects the slope of the quantity of light from the light source. It should be noted that the R (red), G (green) and B (blue) signals outputted by the A/D converter 102 are eight-bit digital image signals.

The CCD 101 includes three CCD line sensors for R, G, B arranged with a fixed distance between them. Consequently, the digital image signals mentioned above possess a temporal offset produced by the spatial offset of the CCD line sensors. This temporal offset is corrected in a three-line joining unit 104.

The output of the unit 104 enters an input masking unit 105, which corrects the spectral characteristics of the R, G, B signals from the CCD 101 to standard RGB space. A LOG converter 106, which is a look-up table constituted by a RAM, converts the luminance signals of R (red), G (green) and B (blue) to density signals of C (cyan), M (magenta) and Y (yellow). A masking/UCR unit 107 eliminates the color impurity of toner, which is used for printing, from the entered C (cyan), M (magenta) and Y (yellow) density signals and generates a Bk (black) signal. The output of the masking/UCR unit 107 enters an F-value corrector 108, which is a correction table for correcting the density value (F value) color by color in conformity with the designation of density recorded. A zooming unit 109, which receives the output of the F-value corrector 108, varies the size of the image.

On the basis of a basic clock VCLK, described later, a synchronizing signal generator 110 generates the synchronizing signals shown in FIG. 2.

Figure 2:
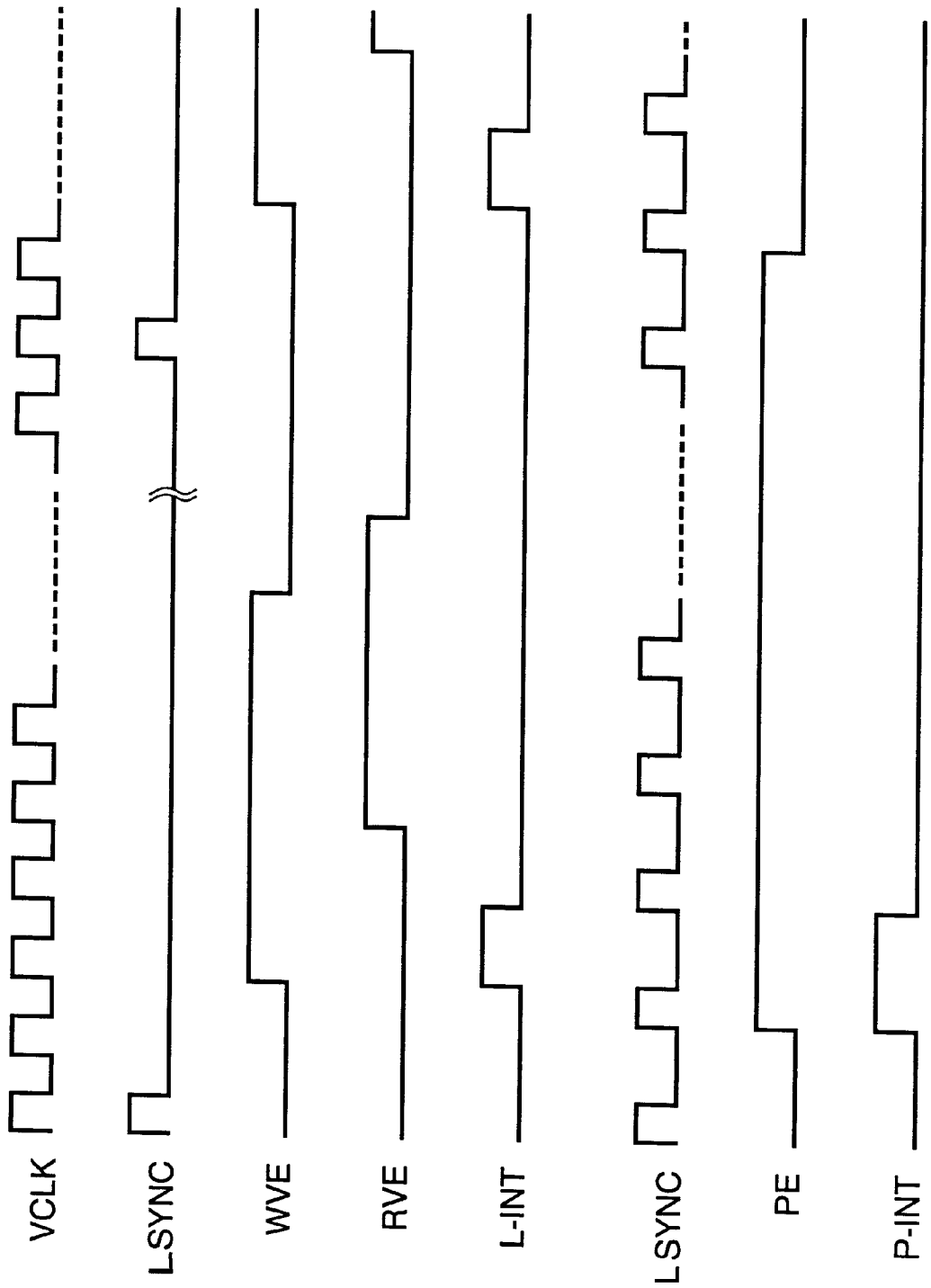
FIG. 2 is a timing chart of signals in a synchronizing signal generator shown in FIG. 1.

In FIG. 2, LSYNC is a synchronizing signal representing the beginning of one line (in the main-scan direction), RVE and WVE are main-scan synchronizing signals for controlling the zooming unit 109, and PE is a signal representing the effective interval of one page (in the sub-scan direction) of the image. L-INT and P-INT signals will be described later.

Figure 3:
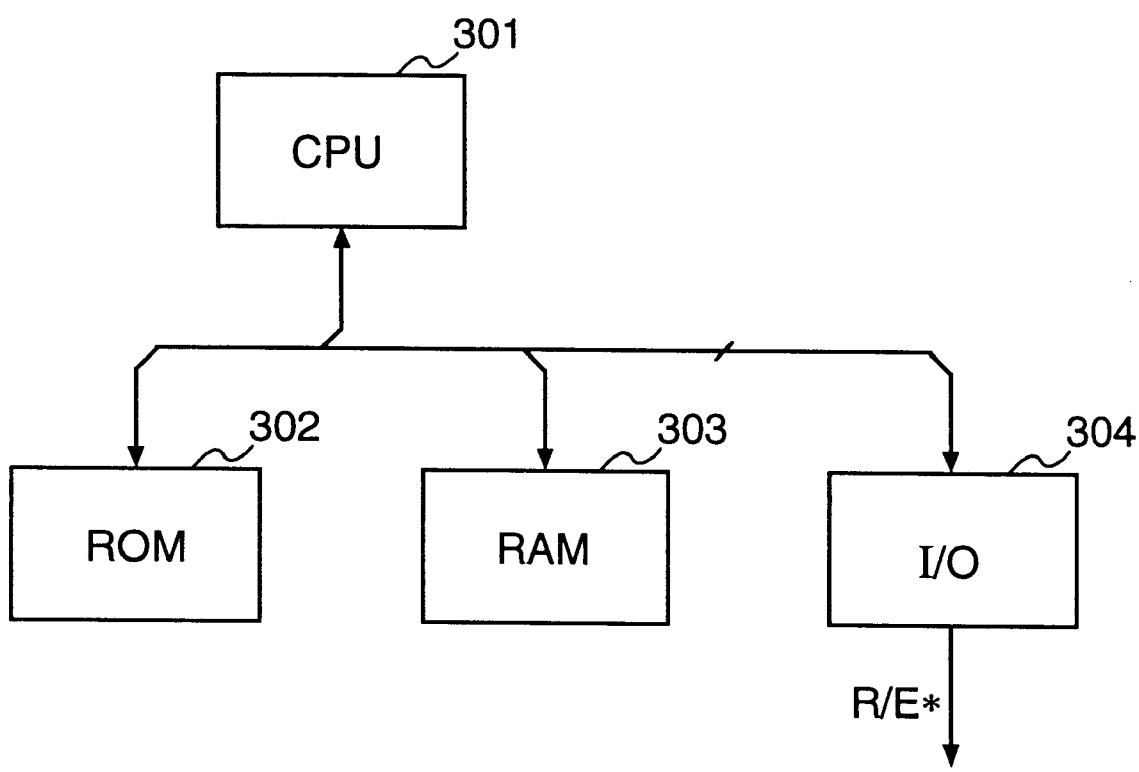
FIG. 3 is a block diagram showing the architecture of a controller depicted in FIG. 1.

A controller 111, which is connected to the zooming unit 109, is composed of the components shown in FIG. 3, namely a microcomputer (referred to as a CPU below) 301 for supervising overall control of the apparatus, a ROM 302 storing a program executed by the CPU 301, a RAM 303 used as a work area when various programs are run, and an input/output port (referred to as an I/O port below) 304 connected to the CPU 301. The I/O port 304 outputs an R/E* signal.

With reference again to FIG. 1, a clock outputted by an oscillator 112 is frequency-divided by a frequency divider circuit 113, which delivers this signal to the synchronizing signal generator 110 as the basic clock VLCK.

(Zooming Unit Architecture)

In a digital full-color copier, zooming in the main-scan direction is carried out by controlling the writing of image data to a zoom memory and the reading of data from the memory. More specifically, if the same image data are read out of the memory in successive fashion, enlargement is performed. If image data written to the memory are written upon being culled or subsampled, reduction is carried out. According to the architecture of this embodiment, prescribed circuitry is added onto the zooming circuit to make possible to the formation of an italicized image as well.

Figure 4:
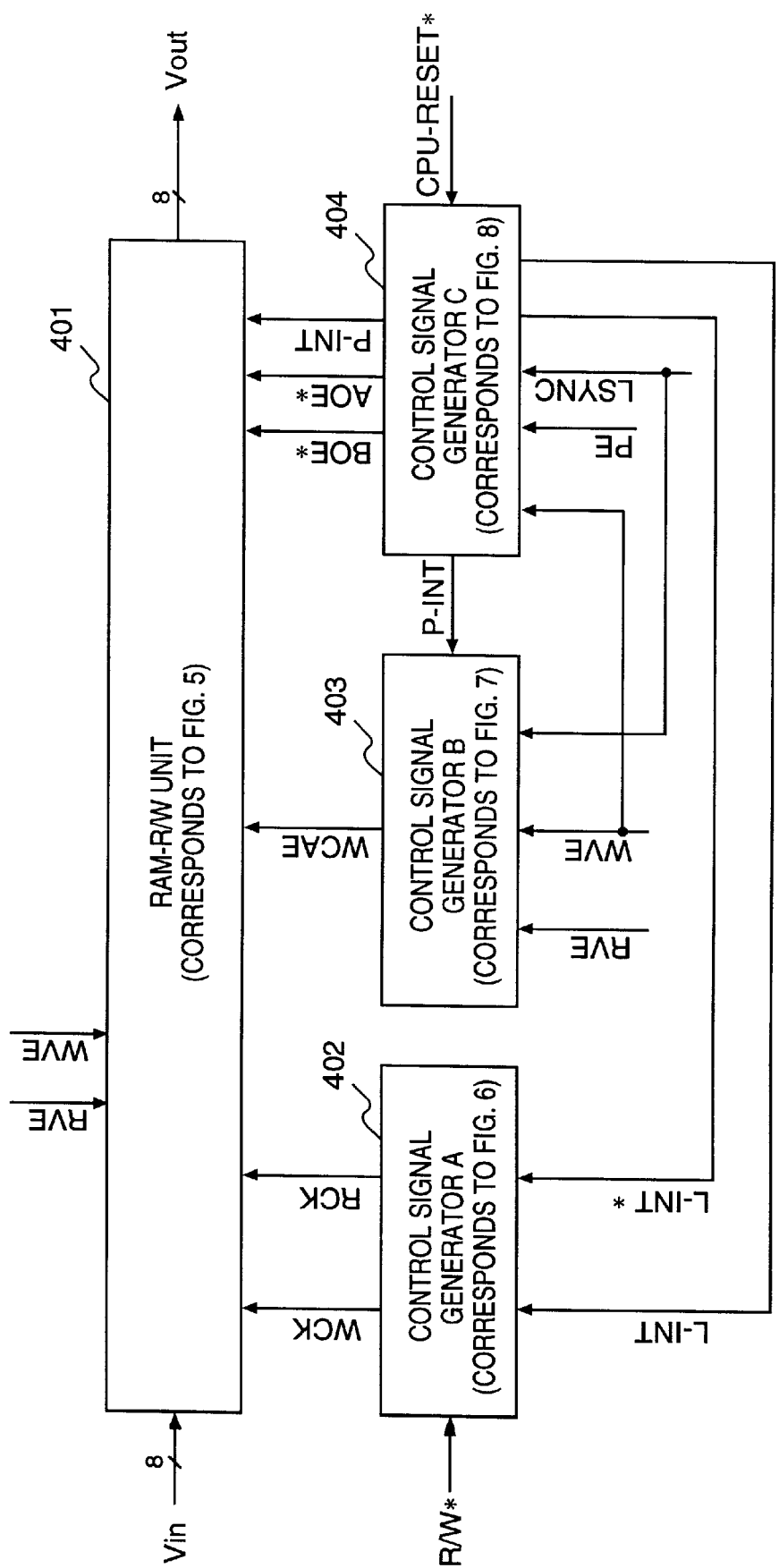
FIG. 4 is a block diagram illustrating the architecture of a zooming unit shown in FIG. 1.

FIG. 4 is a block diagram illustrating the architecture of the zooming unit 109 shown in FIG. 1.

As shown in FIG. 4, the zooming unit 109 includes a RAM-R/W unit 401, a control signal generator (A) 402, a control signal generator (B) 403 and a control signal generator (C) 404. These components of the zooming unit according to this embodiment will now be described in regular order.

(RAM-R/W Unit)

The RAM-R/W unit 401 will be described first with reference to FIG. 5.

Figure 5:
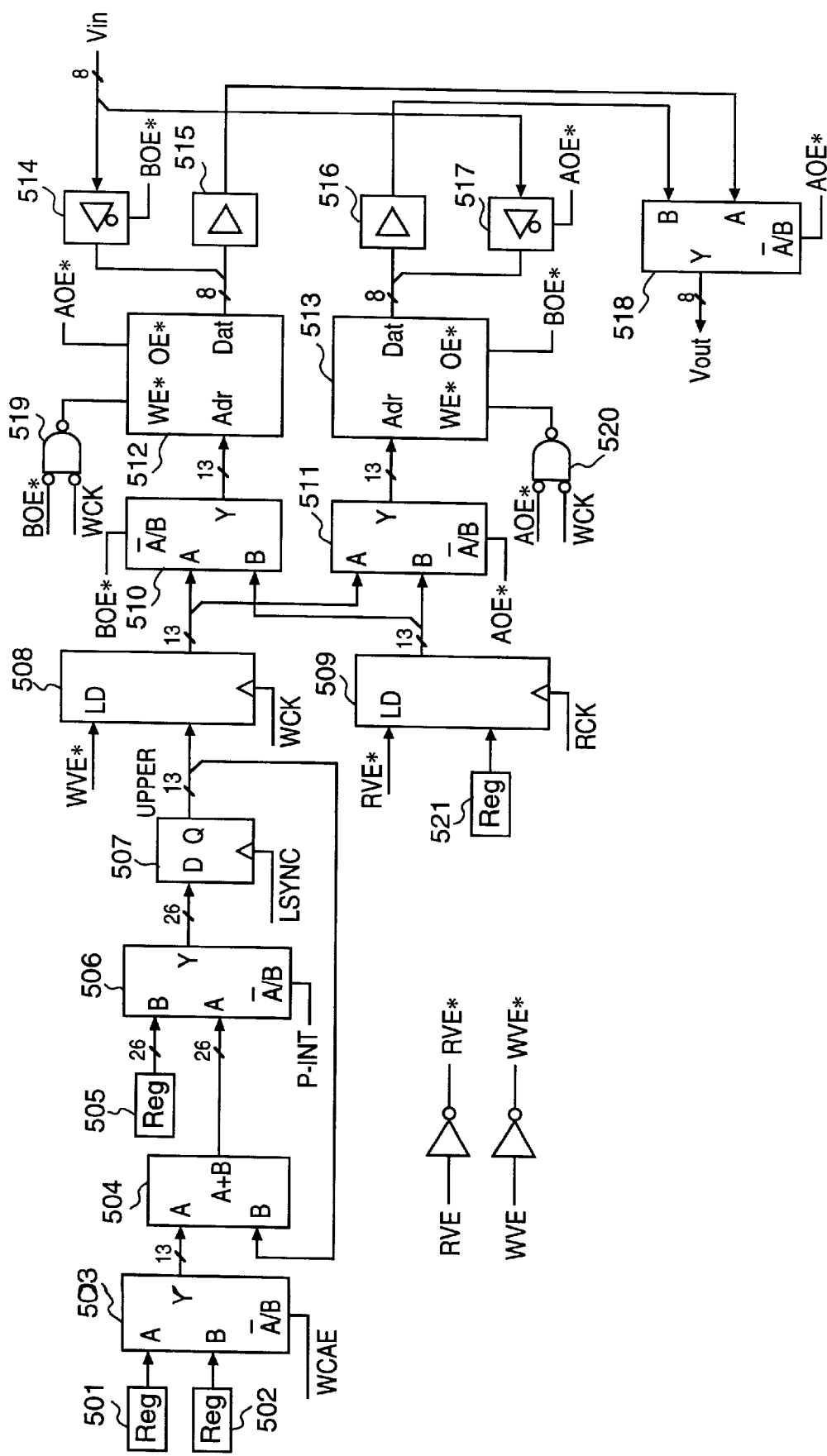
FIG. 5 is a block diagram illustrating the architecture of a RAM-R/W shown in FIG. 4.
Figure 8:
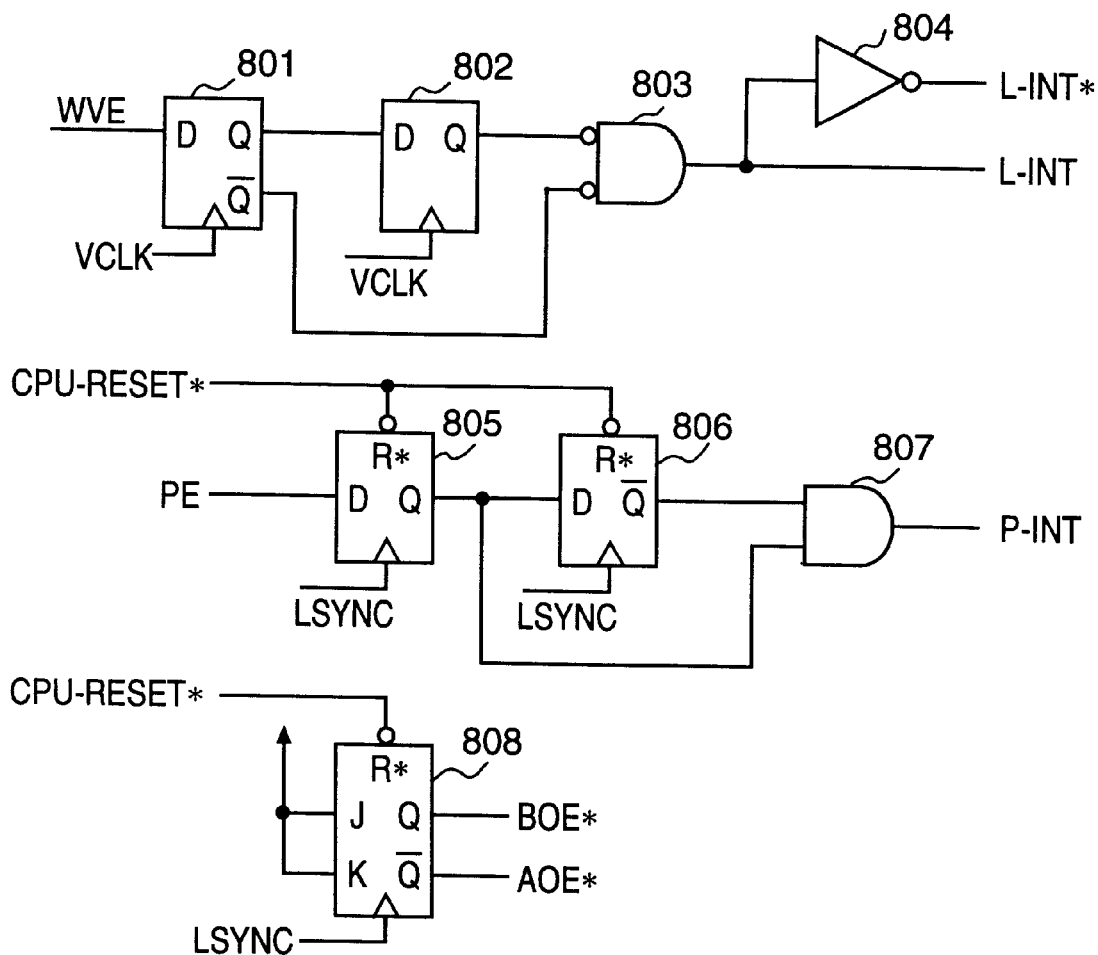
FIG. 8 is a block diagram illustrating the architecture of control signal generator C shown in FIG. 4.
Figure 9:
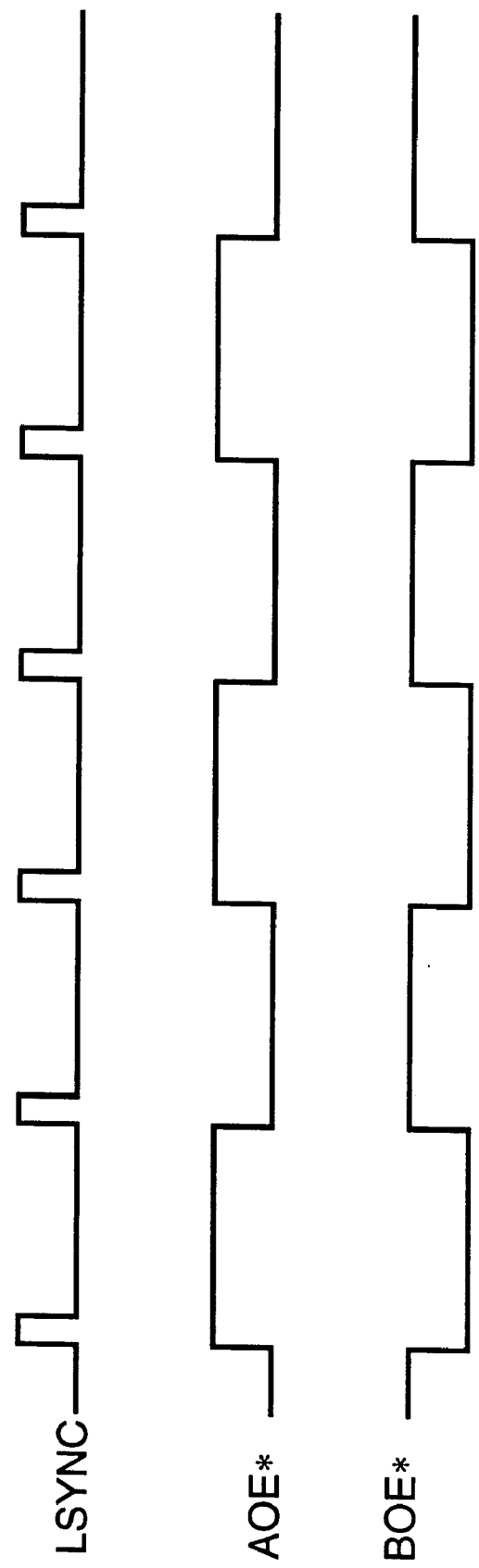
FIG. 9 is a diagram for describing an AOE* signal and BOE* signal.

As shown in FIG. 5, the RAM-R/W unit 401 includes two SRAMs, namely SRAM 512 and SRAM 513, which are written and read in alternating fashion. When signal BOE* is "1" and signal AOE* is "0", image data are read out of the SRAM 512 and image data are written to the SRAM 513. Conversely, when signal AOE* is "1" and signal BOE* is "0", image data are read out of the SRAM 513 and image data are written to the SRAM 512. The signals BOE*, AOE* are produced by a JK flip-flop 808 in the control signal generator (C) 404, the details of which are shown in FIG. 8, and are related to the line-by-line synchronizing signal LSYNC in the manner shown in FIG. 9. FIG. 9 illustrates that the reading and writing of the SRAMs 512 and 513 are performed alternately every line.

A CPU-RESET* signal entering a reset terminal of the JK flip-flop 808 assumes logical "0" temporarily in order to reset the CPU 301 when the power supply is turned on. When "0" enters the reset terminal of the JK flip-flop 808, the signal BOE* rises to logical "1" and the signal AOE* falls to logical "0".

Figure 6:
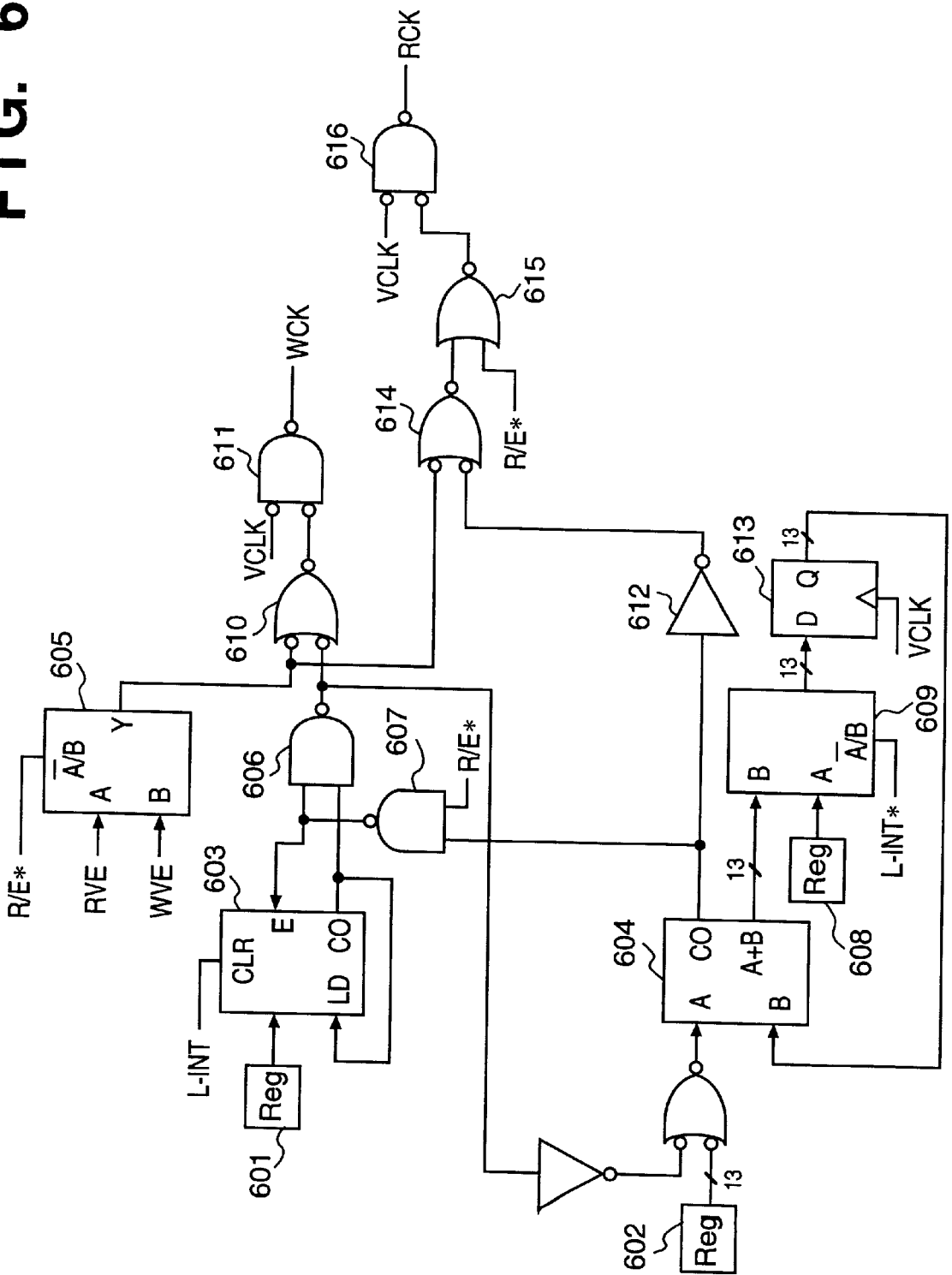
FIG. 6 is a block diagram illustrating the architecture of control signal generator A shown in FIG. 4.

The output of a gate 519, which operates upon the signal BOE* and a signal WCK, enters the WE* terminal of the SRAM 512, and the output of a gate 520, which operates upon the signal AOE* and the signal WCK, enters the WE* terminal of the SRAM 513. This to control the writing of image data to the SRAMs. The signal WCK is produced by the control signal generator (A) 402, the details of which are depicted in FIG. 6.

The addresses used when reading and writing the SRAMs 512, 513 are produced by 13-bit counters 508, 509. The counter 508 is an up-counter for generating addresses when data are written, and the counter 509 is a down-counter for generating addresses when data are read. Clocks for operating the counters 508, 509 are WCK and RCK, respectively, and are generated by the control signal generator (A) 402, the details of which are shown in FIG. 6.

A value that has been set in a register 521 is set in the counter 509 as a loaded value when the RVE* signal that has entered the LD terminal is logical "1". The output value of a latch 507 is set in the counter 509 as a loaded value when the WVE* signal that has entered the LD terminal is logical "1". At the time of the initial line, the value that enters the latch 507 is a value that has been set in a register 505. At all other times the value applied to the latch 507 is the output of an adder 504. The changeover is performed by a selector 506. The signal that controls the selector 506 is the P-INT signal produced by the control signal generator (C) 404 shown in FIG. 8.

The adder 504 adds the output value of the latch 507 and the output value of a selector 503. The inputs to the selector 503 are values that have been set in registers 501, 502. The signal that controls the selector 503 is a WCAE signal produced by the control signal generator (B) 403. As a result, the value loaded in the counter 508 is successively increased so that the write starting address for writing data to the SRAMs 512, 513 every line is increased. The result is an italicized image.

The angle of italicization is decided by the values that enter the registers 501, 502. If the values that have entered the registers 501, 502 are small, the angle of italicization is small. If the values that have entered the registers 501, 502 are large, the angle of italicization is large.

Selectors 510, 511 change over addresses in accordance with the AOE*, BOE* signals in such a manner that the output of counter 508 enters as an address when the respective SRAMs 512, 513 undergo a write operation and the output of the counter 509 enters as an address when the respective SRAMs 512, 513 undergo a read operation.

A tri-state buffer 514 has an impedance that takes on a high value when the BOE* signal is "1". This is to assure that the output of the SRAM 512 and a Vin signal will not interfere with each other. Similarly, a tri-state buffer 517 has an impedance that takes on a high value when the AOE* signal is "1". This is to assure that the output of the SRAM 513 and the Vin signal will not interfere with each other. In accordance with control implemented by the AOE* signal, a selector 518 selects the output of either SRAM 512 or 513 and outputs the selected signal as Vout.

(Control Signal Generator A)

The control signal generator (A) 402 will now be described with reference to FIG. 6.

As shown in FIG. 6, the control signal generator (A) 402 includes a four-bit down-counter 603 in which a value that has been set in a register 601 is set as a loaded value when "1" enters its LD terminal. The L-INT signal, which has been generated by the control signal generator (C) 404 the details of which are shown in FIG. 8, enters a CLR terminal. The L-INT signal rises to logical "1" for the period of the first clock that starts at the leading edge of the WVE signal in one line, as shown in FIG. 2. In other words, when the L-INT signal is "1", the count in the counter 603 is initialized, the output of the CO terminal goes to logical "1" and the loaded value is set. The counter 603 operates during the period of time that "1" is enters the E terminal and is inoperative during the time that "0" enters the E terminal. The CO terminal delivers a "1" output when the value in counter 603 becomes "0". The CO terminal is connected to the LD terminal. That is, when the value in counter 603 becomes "0", the value at the LD terminal is loaded in the counter. The output of a gate 607 enters the E terminal of counter 603. Logical "1" enters the E terminal as long as the R/E* signal is "1". The R/E* signal, which is outputted by the I/O port 304 shown in FIG. 3, is logical "1" at the time of reduction and same-size copying and logical "0" at the time of enlargement.

When enlargement is performed, "0" is set in the register 601 and the value in counter 603 is always "0", as a result of which the CO terminal always outputs "1". Since the R/E* signal is "0", the output of gate 607 is "1". Accordingly, both inputs to a gate 606 are "1" and the output of the gate 606 is "0". Since the output of a gate 610 becomes "0" when the output of gate 606 becomes "0", the signals WCK and VCLK become equal. In other words, the clock pulses applied to the counter 508 for the write address are not culled.

When reduction or same-size copying is performed, one of the two inputs to the gate 606 becomes "0", whereupon the VCLK pulses are culled and the reduced number of VCLK pulses enter the counter 608 as WCK. One input to gate 606 is the output of the CO terminal of counter 603. The method in which culling is performed changes depending upon the value in register 601, which is the value loaded in the counter 603. More specifically, the value in register 601 is changed by the zoom ratio. This relationship is as illustrated in FIG. 10 when reduction or same-size copying is performed. This means that the zoom ratio (M%) and the value in register 601 are related as follows:

value in register 601=integral part $\{1/(M/100)\}-1$

When enlargement is performed, the value in register 601 is set to "0".

The other input to the gate 606 is the output of the gate 607. When the R/E* signal entering the gate 607 is "0", the inverted output of an adder 604 becomes the output of the gate 607. In other words, when "1" is outputted from the CO terminal of the adder 604, the VCLK pulses are culled and the culled VCLK pulses enter the counter 508 as WCK.

The 13-bit adder 604 adds the value that has been set in a register 602 and the output of a latch 613. The output value of the latch 613 is the output of a selector 609, which is controlled by the signal L-INT*. This signal goes to logical "0" for the period of the first clock that starts at the leading edge of the WVE signal in one line. That is, for the period of the first clock that starts at the leading edge of the WVE signal, the value that has been set in the register 608 is outputted by 613, after which the output value of 613 from the preceding clock and the value of the register 602 are added by the adder 604. When the value in adder 604 exceeds 8191, the CO terminal outputs logical "1".

The value set in the register 602 and the zoom ratio (M%) are related as follows:

value in register 602=decimal part $\{1/(M/100)\}\cdot 8192$

When reduction or same-size copying is performed, the R/E* signal, which is one input to the gate 615, is "1", and therefore the output of gate 615 is "0". This output is RCK, which is the VCLK signal per se. At the time of enlargement, the signal RCK becomes the same as the signal VCLK when either one of the two inputs to gate 614 becomes "0". One input to the gate 614 is the output of a selector 605. This signal becomes the RVE signal at the time of enlargement and the WVE signal at the time of reduction or same-size copying. The other input to the gate 614 is the CO output of adder 604 after this output is inverted by an inverter 612. In other words, RCK becomes the same as VCLK when the CO output of adder 604 becomes "1". The signal RCK enters the counter 509 in FIG. 5, which is incremented by the leading edge of the signal RCK. This increments the address from which data is read out of the RAM.

(Control Signal Generator B)

The control signal generator (B) 403 will now be described with reference to FIG. 7.

The control signal generator (B) 403 generates the WCAE signal. This is a control signal by which the selector 503 changes over the sum in adder 504 in order to change the line-by-line initial value of the write address of the RAM in FIG. 5.

Figure 11:
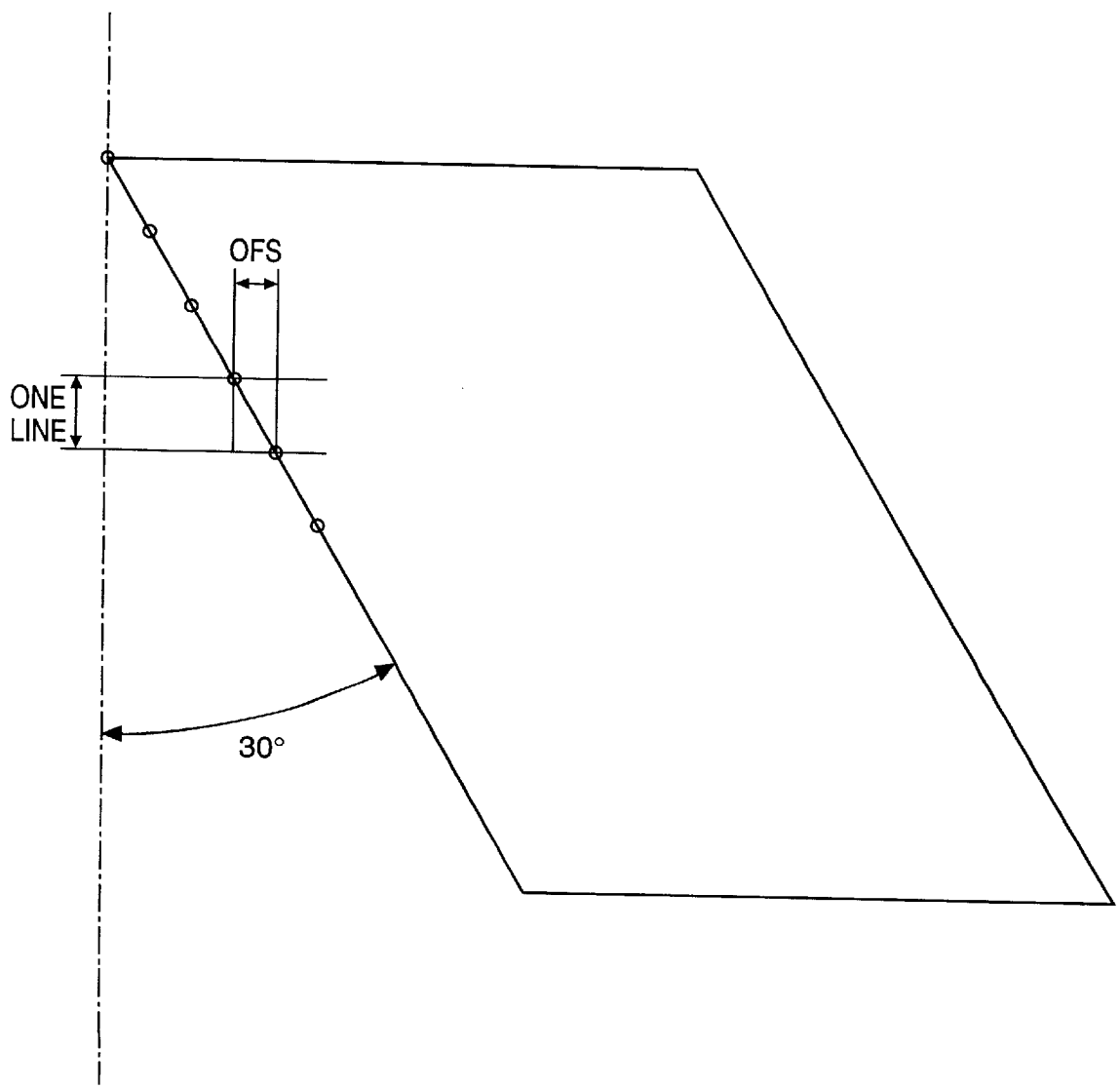
FIG. 11 is a diagram for describing an italicized image based upon italic angle and zoom ratio.

By way of example, a case in which a 30-degree italicized image is formed at a copying magnification of 50% will be considered with reference to FIG. 11. In this case, it is required that the image be shifted while being offset (OFS) every line by a certain decided value. This value can be calculated in accordance with the following equation:

$$OFS = \tan \theta \text{ (degrees)} \times 100/\text{magnification (\%)}$$

For the magnification of 50% and the angle of 30°, we have $$OFS = \tan 30 \text{ (degrees)} \; 100/50(\%) \approx 1.1547$$

Thus, it will suffice if the image is shifted in increments of 1.1547 pixels every line. In other words, in the example set forth above, the write address of the RAM should be increased in increments of 1.1547.

The sum value which is the integral part of OFS is set in the register 501 in FIG. 5, as indicated by the equation below, and a value that is larger than the value in register 501 by one is set in the register 502. In a case where the italicization angle is negative, the complement is set in the register 501 and a value that is smaller than the value in register 501 by one is set in the register 502.

$$\text{register } \mathbf{501} = \text{integral part (OFS)}$$

Figure 7:
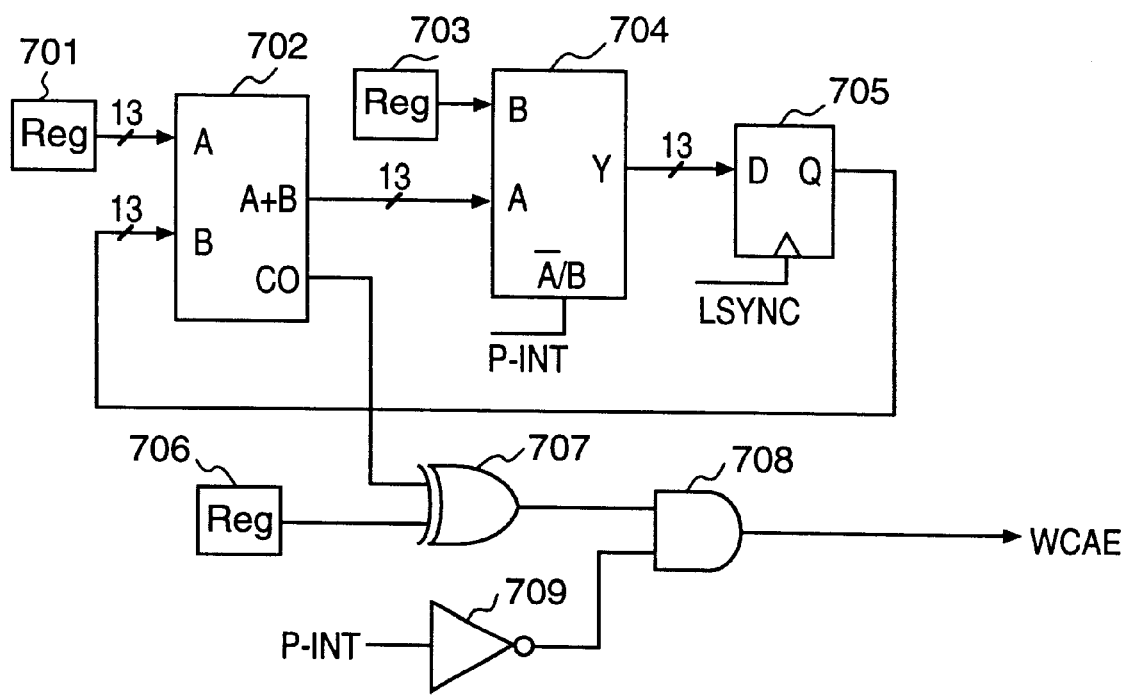
FIG. 7 is a block diagram illustrating the architecture of control signal generator B shown in FIG. 4.

Summing of the decimal part of OFS is carried out by an adder 702 in FIG. 7. Since this is a 13-bit adder, the value in register 701 that is to serve as the sum value is set to be a value which is 8192 times the decimal part of OFS. That is, the value in register 701 is as given by the following equation:

$$\text{register } \mathbf{701} = \text{integral part } (OFS) \times 8192$$

The value in register 701 also is set to the complement of the value in the above-mentioned equation when the angle of italicization is negative. In such case "1" is set in the one-bit register 706 so that the polarity of the signal from the CO terminal of adder 702 will be inverted by a gate 707, and it is so arranged that the inverted output of the CO terminal becomes the WCAE signal.

A register 703 contains the initial value of the sum. This value usually is set to "0". The value in register 703 is selected by the control signal P-INT as the output of selector 704 only at the time of the initial line, after which the output of the adder 702 of the preceding line, in which the value in register 701 has been added, is selected.

The P-INT signal becomes logical "1" only for the initial line of the page, as shown in FIG. 2. This signal is produced by the control signal generator (C) 404 shown in FIG. 4.

(Control Signal Generator C)

The control signal generator (C) 404 will now be described with reference to FIG. 8. This generator generates the above-mentioned signals L-INT, L-INT*, P-INT, AOE* and BOE*. The control signal generator (C) 404 includes flip-flops 801 and 802 that operate in sync with VCLK. The WVE signal is inverted to a signal synchronized to VCLK. The AND between this inverted signal and a signal obtained by delaying WVE by one clock is obtained at a gate 803. The output L-INT of gate 803 attains the "1" level for the period of one clock every line, as shown in FIG. 2. Further, the L-INT* signal is the result of inverting the L-INT signal by an inverter 804.

The control signal generator (C) 404 further includes flip-flops 805 and 806, which are equipped with reset terminals, that operate in sync with VCLK. The synchronizing signal PE, which indicates the effective interval of the image in the sub-scan direction, is converted to a signal synchronized to the main-scan synchronizing signal LSYNC. The AND between this signal and a signal obtained by delaying this signal by one line is obtained at a gate 607. The output P-INT of gate 807 attains the "1" level for the period of one line every page, as shown in FIG. 2.

A JK flip-flop 808 has its output polarities toggled whenever the leading edge of the LSYNC signal enters. As a result, signals whose logic changes between "1" and "0" every line are obtained, as shown in FIG. 9. These are the AOE* and BOE* signals, the polarities of which are the opposite of each other.

Thus, the first embodiment is such that when an image signal which enters every line is stored in memory, the write address of this memory is controlled in accordance with the amount of movement and zoom ratio of the image. This makes possible the high-speed generation of an italic image having a high image quality.

<Second Embodiment>

A second embodiment according to the present invention will now be described in detail.

In the first embodiment, the address at which data is written to memory is controlled. In the second embodiment, the address at which data is read out of memory and the address at which data is written to memory are controlled in accordance with the amount of movement and zoom ratio of the image.

(Image Processor)

Figure 12:
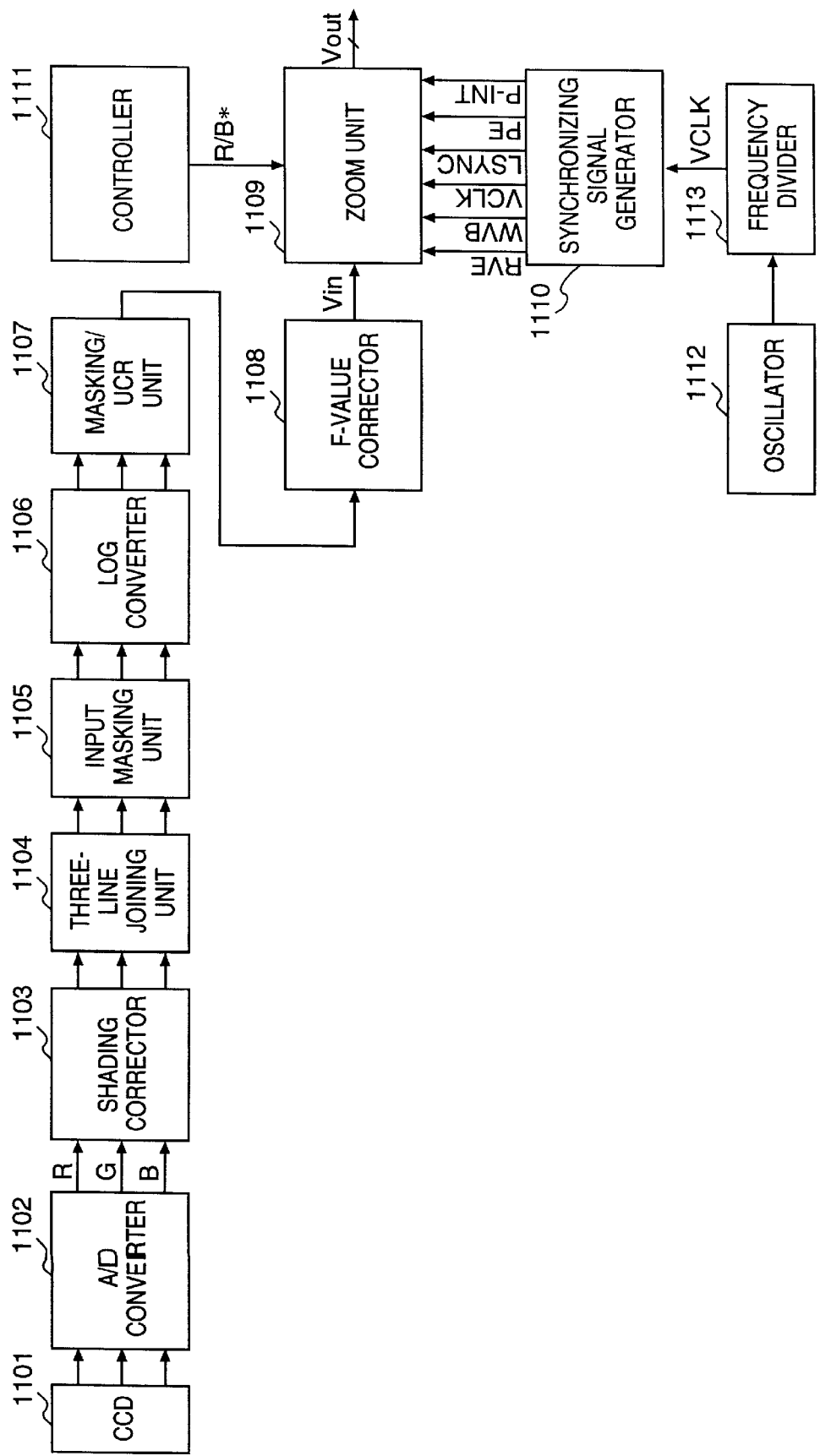
FIG. 12 is a block diagram illustrating the architecture of the image processor in a digital full-color copier according to a second embodiment of the present invention.

FIG. 12 is a block diagram illustrating the architecture of an image processor in a digital full-color copier.

As shown in FIG. 12, the image processor includes a three-line CCD 1101 equipped with filters for the colors R (red), G (green) and B (blue). The CCD 1101 separates reflected light from an original document into colors and converts the same to electric signals R, G, B. An A/D converter 1102 converts the analog R, G, B signals from the CCD 1101 to digital R, G, B signals. A shading correction unit 1103 corrects shading distortion caused by uneven sensitivity of the pixels of the CCD 1101 and by the slope of the quantity of light from the light source. It should be noted that the R (red), G (green) and B (blue) signals outputted by the A/D converter 1102 are eight-bit digital image signals.

The CCD 1101 includes three CCD line sensors for R, G, B arranged with a fixed distance between them. Consequently, the digital image signals mentioned above possess a temporal offset produced by the spatial offset of the three CCD line sensors. This temporal offset is corrected in a three-line joining unit 1104.

The output of the unit 1104 enters an input masking unit 1105, which corrects the spectral characteristics of the R, G, B signals from the CCD 1101 to standard RGB space. A LOG converter 1106, which is constituted by a look-up table written in a RAM, converts the luminance signals of R (red), G (green) and B (blue) to density signals of C (cyan), M (magenta) and Y (yellow). A masking/UCR unit 1107 eliminates the color impurity of toner, which is used for printing, from the entered C, M, Y density signals and generates a Bk (black) signal. The output of the masking/UCR unit 1107 enters an F-value corrector 1108, which is constituted by a correction table for correcting the density value (F value) color by color in conformity with the designated density. A zooming unit 1109, which receives the output of the F-value corrector 1108, varies the size of the image. An oscillator 1112 generates a basic clock VCLK for processing images. The output of the oscillator 1112 is frequency-divided by a frequency dividing circuit 1113. The frequency-divided output is the signal VCLK.

A controller 1111, which is connected to the zooming unit 1109, is composed of a microcomputer (referred to as a CPU below) for supervising overall control of the apparatus, a ROM storing a program executed by the CPU, a RAM used as a work area when various programs are run, and an input/output port (referred to as an I/O port below) connected to the CPU. The I/O port outputs an R/E* signal.

Figure 13:
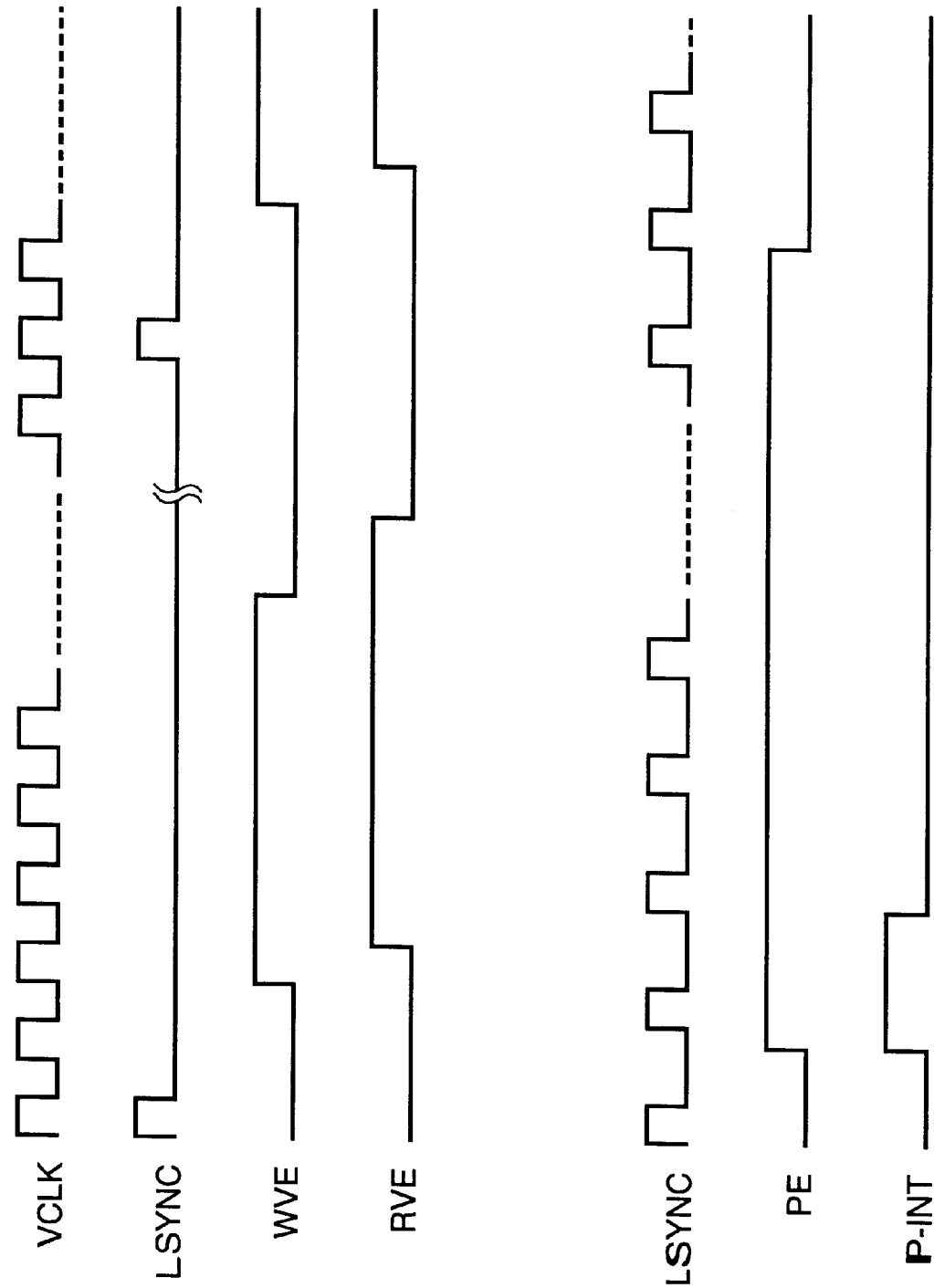
FIG. 13 is a timing chart of various synchronizing signals generated by a synchronizing signal generator shown in FIG. 12.

A synchronizing signal generator 1110 generates various synchronizing signals shown in FIG. 13.

In FIG. 12, LSYNC is a synchronizing signal representing the beginning of one line (in the main-scan direction), RVE and WVE are main-scan synchronizing signals for controlling the zooming unit 1109, and PE is a signal representing the effective interval of one page (in the sub-scan direction) of the image. L-INT and P-INT signals will be described later.

In this digital full-color copier, zooming in the main-scan direction is carried out by controlling writing and reading of image data in a zooming memory, which is provided in the zooming unit 1109. More specifically, if the same image data are read out of the memory in successive fashion, enlargement is performed. If image data written to the memory are written upon being culled or subsampled, reduction is carried out.

(Zooming Unit)

Figure 14:
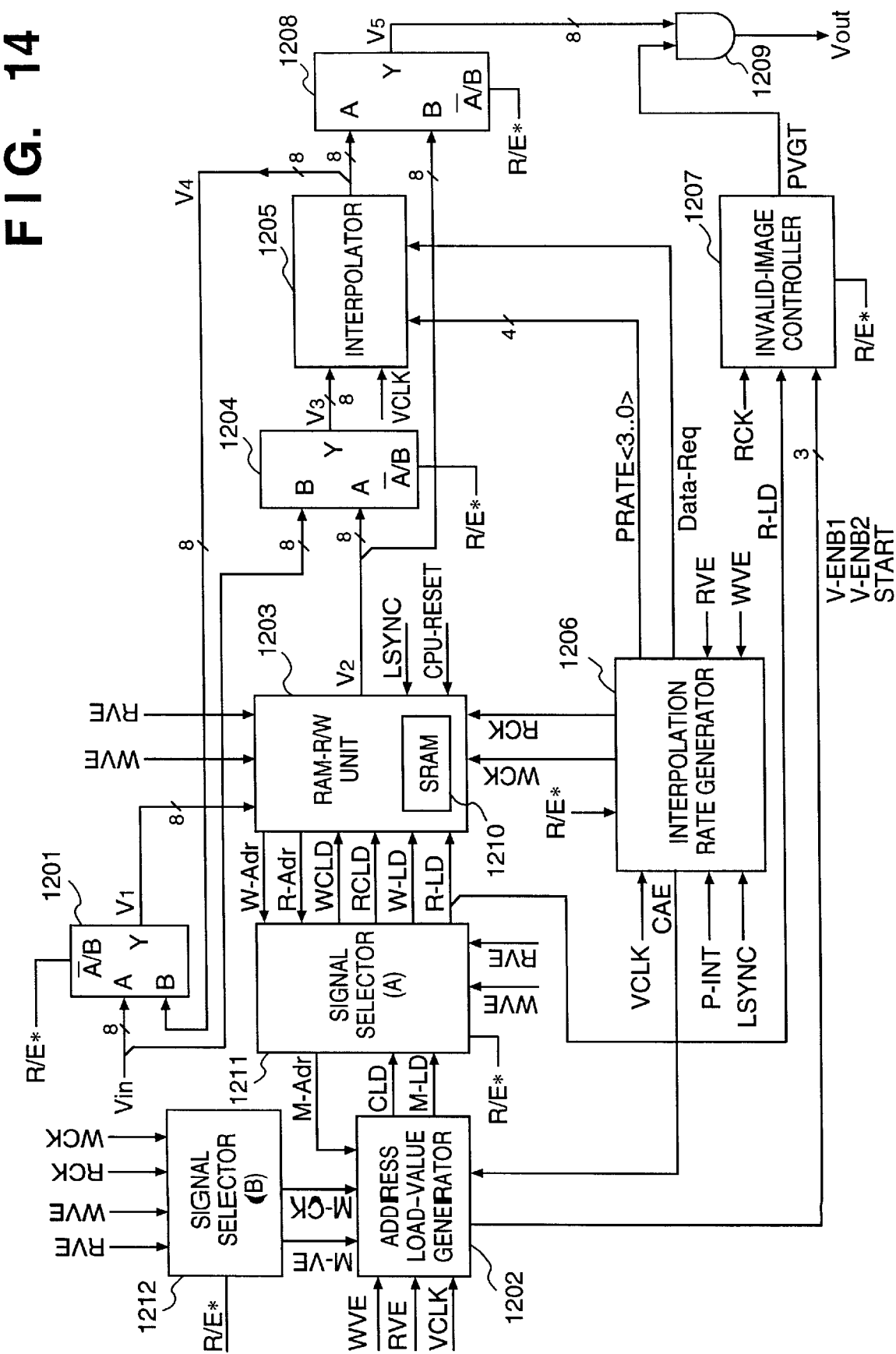
FIG. 14 is a block diagram illustrating the detailed architecture of a zooming unit in the second embodiment.

FIG. 14 is a block diagram illustrating the architecture of the zooming unit 1109 (FIG. 12) according to the second embodiment.

As shown in FIG. 14, the zooming unit 1109 includes selectors 1201, 1204 and 1208 for changing over output in dependence upon the R/E* signal. The R/E* signal, which is outputted from the I/O port of controller 1111, is logical "1" at the time of reduction and same-size copying and logical "0" at the time of enlargement. Owing to the selectors, the flow of image signals at the time of enlargement differs from that at all other times. More specifically, when enlargement is performed (i.e., when R/E* is "0"), the image signals flow through the selector 1101, a RAM-R/W unit 1203, the selector 1204, an interpolator 1205, the selector 1208 and a gate 1209, in the order mentioned. At the time of reduction or same-size copying (i.e., when R/E* is "1"), the image signals flow through the selector 1104, the interpolator 1205, the selector 1201, the RAM-R/W unit 1203, the selector 1208 and the gate 1209, in the order mentioned.

The gate 1209 is for eliminating an invalid image and is controlled by a signal PGVT from an invalid-image controller 1207, described later. The RAM-R/W unit 1203 reads image data from and writes image data to an internal SRAM 1210. An address load-value generator 1202 generates an address, which is used when reading data from and writing data to the SRAM 1210 by the RAM-R/W unit 1203, as a 13-bit loaded value CLD, which is the starting address of every line.

The interpolator 1205 subjects image data to an interpolation operation, and an interpolation ratio generator 1206 generates a four-bit interpolation rate PRATE <3 . . . 0> when interpolation is performed.

A signal selector (A) 1211 controls the signals between the RAM-R/W unit 1203 and address load-value generator 1202 in dependence upon the R/E* signal. Similarly, a signal selector (B) 1212 controls the signal that enter the address load-value generator 1202 in dependence upon the R/E* signal.

The elements in FIG. 14 and the operation thereof will now be described in greater detail.

(RAM-R/W Unit 1203)

The details of the RAM-R/W unit 1203 will be described with reference to FIG. 15. The SRAM 1210 incorporated in the RAM-R/W unit 1203 comprises two SRAMs, namely an SRAM-A 1308 and an SRAM-B 1307, which are written and read in alternating fashion. More specifically, when signal BOE* is "1" and signal AOE* is "0", image data are read out of the SRAM-B 1307 and image data are written to the SRAM-A 1308. Conversely, when signal AOE* is "1" and signal BOE* is "0", image data are read out of the SRAM-A 1308 and image data are written to the SRAM-B 1307. The signals BOE*, AOE* are produced by a JK flip-flop 1304 and are related to the line-by-line synchronizing signal LSYNC in the manner shown in FIG. 16.

A CPU-RESET* signal entering a reset terminal of the JK flip-flop 1304 assumes logical "0" temporarily in order to reset the CPU in the controller 1111 when the power supply is turned on. When "0" enters the reset terminal of the JK flip-flop 1304, the signal BOE* rises to logical "1" and the signal AOE* falls to logical "0".

The output of a gate 1310 (1309), which operates upon the signal AOE* (BOE*) and a signal WCK, enters the WE* terminal of the SRAM 1307 (1308). This to control the writing of image data to the SRAM 1307 (1308). The signal WCK enters from the interpolation rate generator 1206 in FIG. 14.

The addresses used when reading and writing the SRAM 1307 (1308) are produced by 13-bit counters 1302, 1303 . . . The counter 1302 is an up-counter for generating addresses when data are written, and the counter 1303 is a down-counter for generating addresses when data are read. Clocks for operating the counters 1302, 1303 are WCK and RCK, respectively, and are generated by the interpolation rate generator 1206 in FIG. 14.

The value of WCLD is set in the counter 1302 as a loaded value when a signal W-LD, which enters the LD terminal of the counter, is at logical "1". The value of RCLD is set in the counter 1303 as a loaded value when a signal R-LD, which enters the LD terminal of the counter, is at logical "1". The counters 1302, 1303 perform a counting operation when the WVE signal and RVE signal, respectively, applied to the E terminals are "1", and cease operating when these signals are "0". Accordingly, changing the value of RCLD applied to counter 1303 makes it possible to change the readout starting addresses of the SRAMs 1308, 1307, and changing the value of WCLD applied to counter 1302 makes it possible to change the write starting addresses of the SRAMs 1308, 1307.

Figure 17:
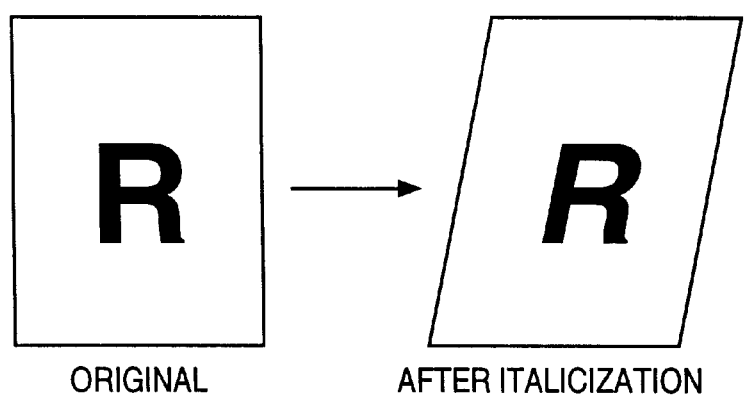
FIG. 17 is a diagram showing an output image that has been subjected to italicization processing.

By thus changing the readout starting address at the time of enlargement and the write starting address at the time of reduction or same-size copying, an italicization function of the kind shown in FIG. 17 can be attained.

Switching between changing of the readout starting address and changing of the write starting address is performed depending upon whether the counter load value CLD, which is outputted by the address load-value generator 1202 in FIG. 14, is outputted as RCLD or WCLD, with the selection being made by the signal selector (A) 1111 in dependence upon the R/E* signal.

Figure 15:
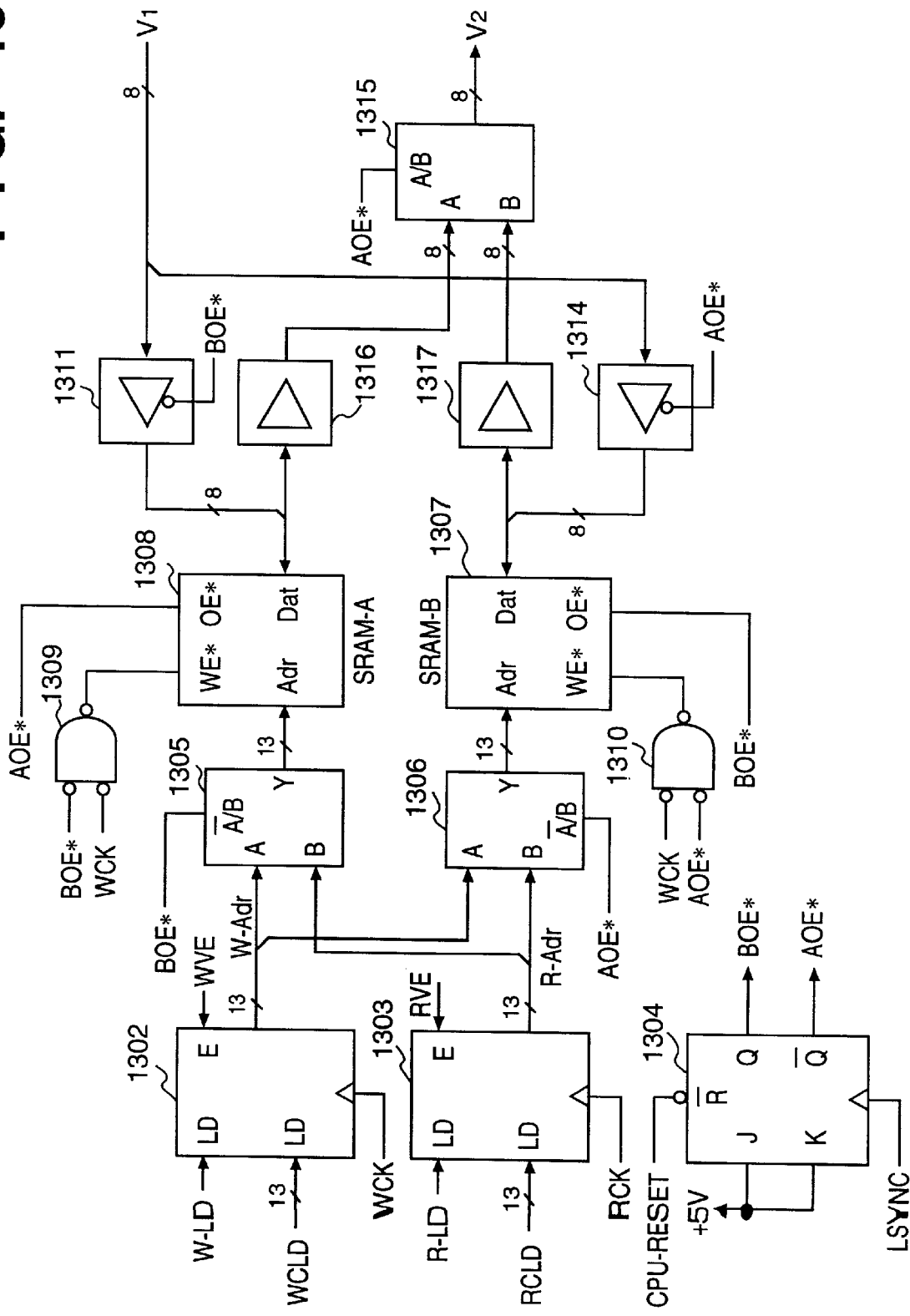
FIG. 15 is a block diagram illustrating the architecture of a RAM-R/W shown in FIG. 14.
Figure 16:
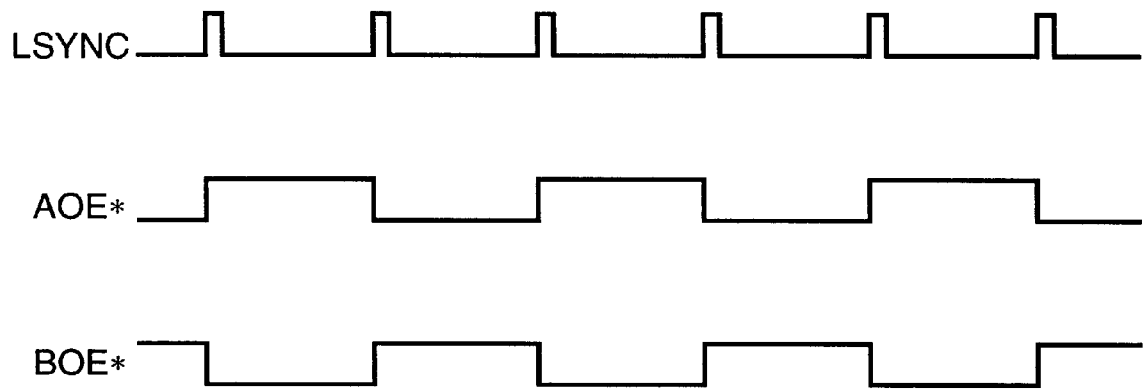
FIG. 16 is a diagram for illustrating the relationship between a BOE* signal and an AOE* signal generated in accordance with a synchronizing signal SLYNC every line.

The selectors 1305, 1306 in FIG. 15 are for changing over the input address in accordance with the AOE* signal and BOE* signal in such a manner that the output of the counter 1302 enters as an address when SRAM 1308 or 1307 is written and the output of the counter 1303 enters as an address when SRAM 1308 or 1307 is read.

An image signal V1 from the selector 1201 enters a tri-state buffer 1311, the output whereof takes on a high impedance when the BOE* signal is logical "1". This is to assure that the output of the SRAM-A 1308 and the output of the tri-state buffer 1311 will not interfere with each other. Similarly, the image signal V1 from the selector 1201 enters a tri-state buffer 1314, the output whereof takes on a high impedance when the AOE* signal is logical "1". This is to assure that the output of the SRAM-B 1307 and the output of the tri-state buffer 1311 will not interfere with each other.

A selector 1315 selects data, which enter from the SRAM-A 1308 via a buffer 1316, when the SRAM-A 1308 is being read. Further, the selector 1315 selects data, which enter from the SRAM-B 1307 via a buffer 1317, when the SRAM-B 1307 is being read. The selected data are outputted as V2.

(Invalid-image Controller 1207)

The details of the invalid-image controller 1207 will be described with reference to FIG. 18.

The OR of signals V-ENB1, V-ENB2 and START, which enter from the address load-value generator 1102, enter a JK flip-flop 1402. If even one of these input signals is logical "1", a PVGT signal rises to logical "1". If all of these input signals are at logical "0", the PVGT signal reverts to "0" when the R-LD signal rises to logical "1". A flip-flop 1401 is for adjusting the circuit delay. The gate 1403 is so designed that PVGT becomes logical "1" when the R/E* signal is "1" (i.e., at the time of reduction or same-size copying).

(Address Load-value Generator 1202)

Figure 19:
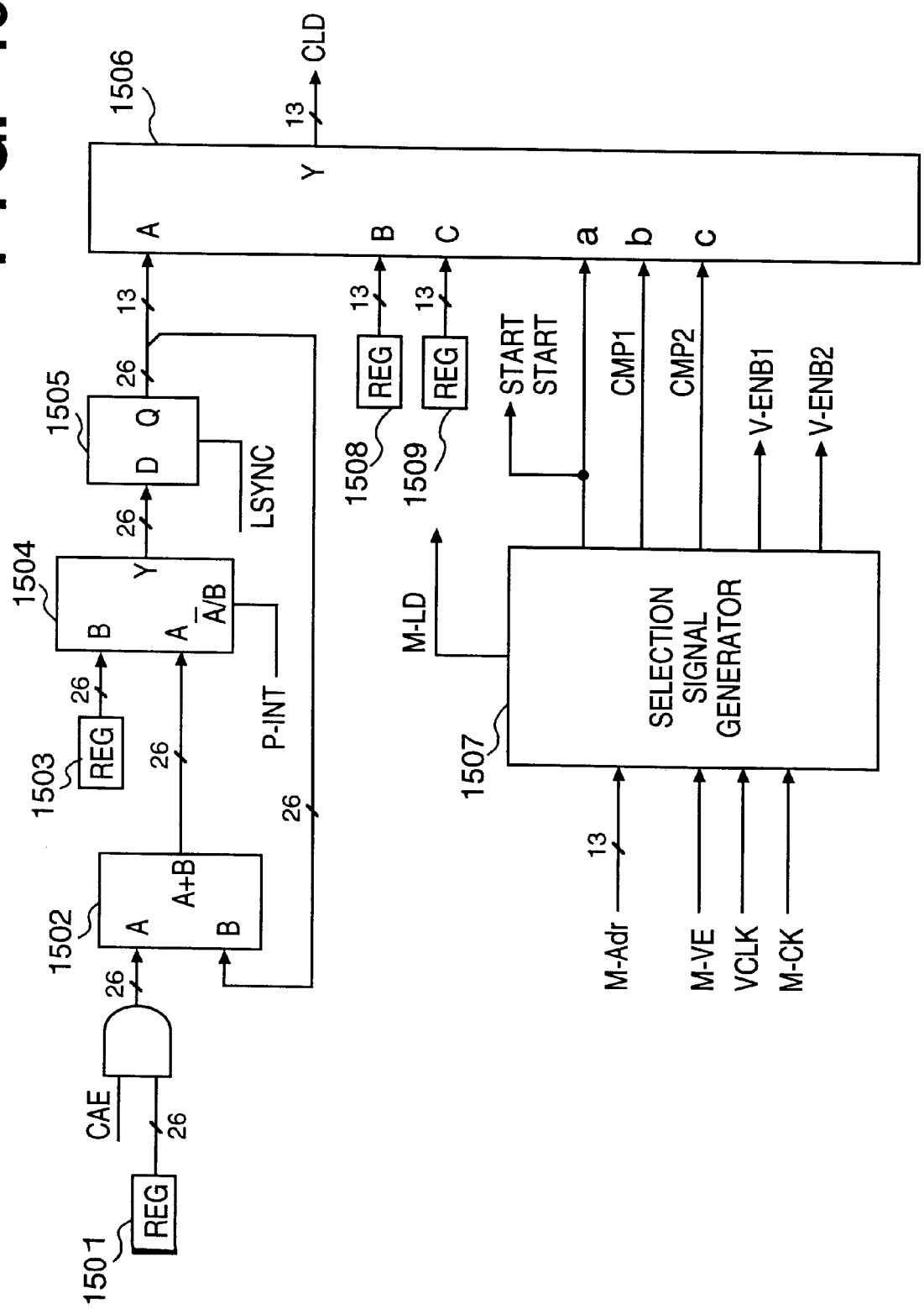
FIG. 19 is a block diagram illustrating the detailed architecture of an address load-value generator shown in FIG. 14.

FIG. 19 is a diagram showing the details of the address load-value generator 1202.

Figures 20, 21:
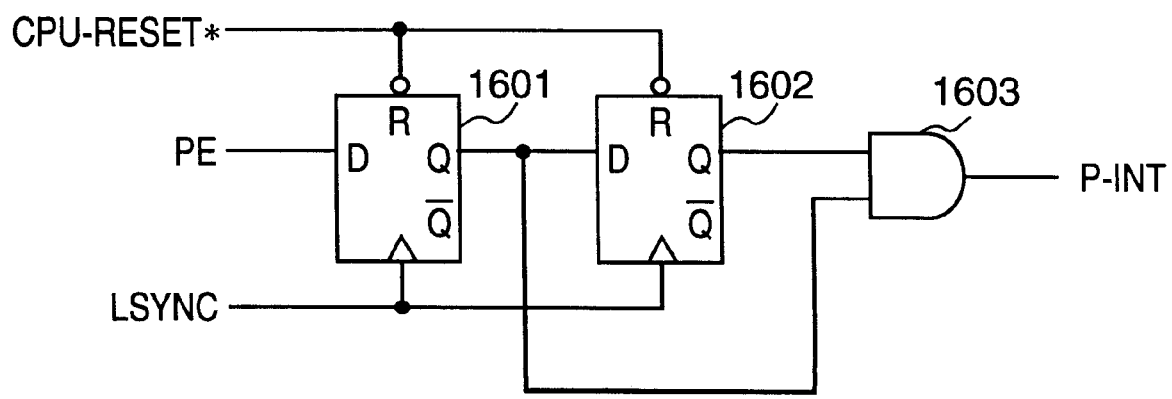
FIG. 20 is a diagram showing the relationship between a, b, c control inputs and a Y output of a selector shown in FIG. 19.
FIG. 21 is a diagram showing the architecture of P-INT signal generating circuit within a synchronizing signal generator.

As shown in FIG. 19, the address load-value generator 1202 includes a selector 1506 for selecting data, outputted from a Y terminal as the address loading value CLD, from data which enter at input terminals A, B, C. FIG. 20 is a diagram showing the relationship between control inputs, which enter a, b, c terminals of the selector 1506, and the selected Y output. Selection signals START, CMP1 and CMP2 are generated by a selection signal generator 1507. The data that enter the terminals B and C are values set beforehand in registers 1508 and 1509 by the CPU inside the controller 1111.

The data that enter the terminal A represent the value of a first line of the image set in the register 1503. The output of an adder 1502 enters terminal A in the case of subsequent lines. This changeover is made by a selector 1504 in accordance with the P-INT signal. FIG. 21 is a diagram showing the architecture of a P-INT signal generating circuit provided in the synchronizing signal generator 1110 shown in FIG. 12. This circuit generates the P-INT signal, which rises to logical "1" for the period of the initial line of the image, as shown in FIG. 13. That is, immediately after the power supply is turned on, the signal CPU-RESET* goes to logical "0" one time and flip-flops 1601, 1602 are initialized, as a result of which the P-INT signal is initially at logical "0". The P-INT signal remains at "0" until the PE signal is generated. When the PE signal is generated, the Q output of flip-flop 1601 and the Q* output of flip-flop 1602 go to logical "1". The gate 1603 outputs "1" until next LSYNC signal enters.

With reference again to FIG. 19, the output of the adder 1502 is the result (26 bits) of adding the inputs to terminals A and B. The value that enters the B terminal of adder 1502 is output data (26 bits) of the preceding line obtained from the selector 1504 and held in a latch 1505. When the CAE signal is "1", the value that has been set in the register 1501 enters the A terminal. When the CAE signal is "0", logical "0" enters the A terminal. In other words, when the CAE signal is "0", the output of the adder is not increased. This is a result similar to that obtained when addition is not carried out. It should be noted that the CAE signal is produced by the interpolation rate generator 1206 shown in FIG. 14.

The START signal shown in FIG. 19 is generated by the circuitry of FIG. 22 (described below) so as to become logical "1" only for the first pixel of an M-VE signal. The output of the selector 1506 (FIG. 19) at this time is composed of data of the 13 higher order bits of the 26-bit data that enter the A terminal from the latch 1505. In other words, the START signal becomes logical "1" for one bit at the beginning of an image, and the start address of every line is loaded in the counter 1303 or 1302 shown in FIG. 1. The counter into which the value is loaded is selected by the signal selector (A) 1211 of FIG. 14 in dependence upon the R/E* signal. The signal selector (A) 1211 will be described in detail later with reference to FIG. 24.

As the result of the foregoing processing, the read starting address applied to the RAM-R/W unit 1203 can be shifted every line when enlargement is performed, and the write starting address can be shifted every line when reduction of same-size copying is carried out. By thus shifting the position of the image, an italicized image is obtained.

The angle of italicization is decided by the value that enters the register 1501 shown in FIG. 19. This value is the address sum. If the value that has entered the register 1501 is small, the angle of italicization is small. If the value that has entered the register 1501 is large, the angle of italicization is large. More specifically, if the angle of italicization is $\theta$, then $8192 \times \tan \theta$ is the value that enters the register 1501. If the angle is negative, the value that enters the register 1501 should be made the complement.

Figure 22:
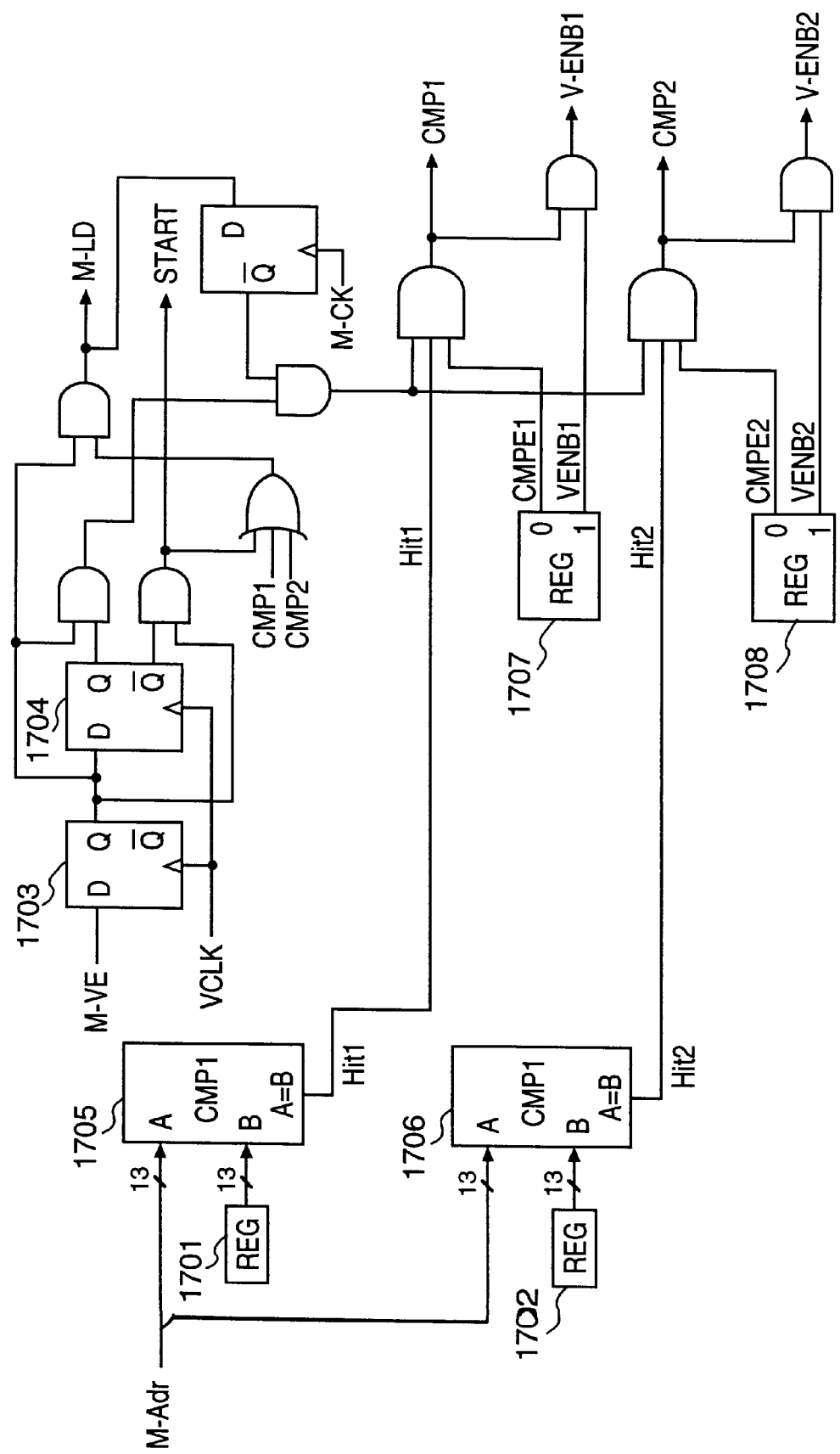
FIG. 22 is a block diagram illustrating the detailed architecture of a selection signal generator shown in FIG. 19.
Figure 23:
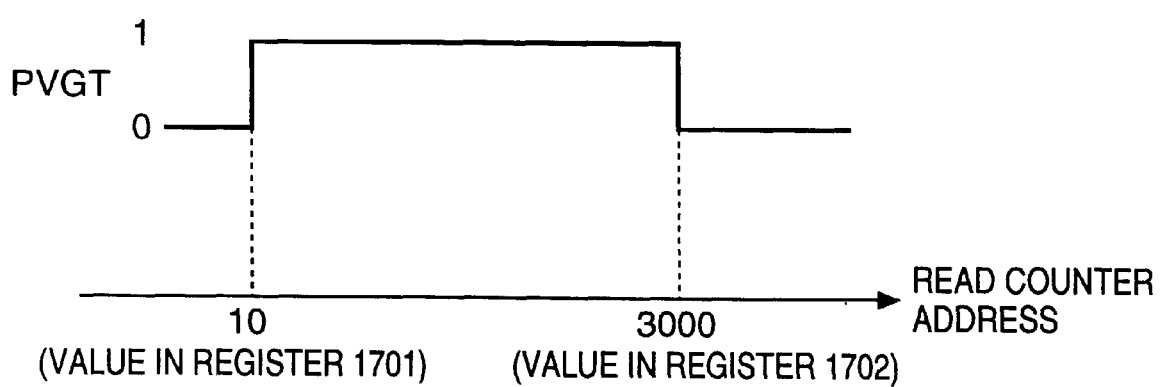
FIG. 23 is a diagram illustrating control based upon a PVGT signal from the invalid-image controller.

FIG. 22 is a diagram showing the details of the selection signal generator 1507 depicted in FIG. 19.

As shown in FIG. 22, the input to the selection signal generator 1507 is a signal M-Adr. This is a 13-bit read address value R-Adr or write address value W-Adr generated by the RAM-R/W unit 1203 shown in FIG. 14. Whichever signal is selected is decided by the selector (A) 1211 shown in FIG. 14.

The signal M-Adr enters the A terminal of a comparator 1705, where it is compared with the value of a register 1701 applied to the B terminal. The comparator 1705 generates a Hit1 signal when the two inputs become equal. A signal CMPE1 from the bit 0 of a register 1707 effects control to allow or forbid circuit control by the Hit1 signal. Circuit control by the Hit1 signal is forbidden when the CMPE1 signal is "0" and is allowed when the CMPE1 signal is "1". When a CMP1 signal is "1", the output from the Y terminal of the selector 1506 shown in FIG. 19 becomes the signal that enters the B terminal. When the CMP1 signal becomes logical "1", a signal VENB1 from bit 1 of the register 1707 becomes a changeover signal (V-ENB1) which validates or invalidates the image. The image is validated when V-ENB1 is "1" and is invalidated when V-ENB1 is "0".

Similarly, when a comparator 1706 senses that the signal M-Adr has become equal to an address that has been set in a register 1702, the comparator 1706 generates a Hit2 signal.

A signal CMPE2 from the bit 0 of a register 1708 effects control to allow or forbid circuit control by the Hit2 signal. Circuit control by the Hit2 signal is forbidden when the CMPE2 signal is "0" and is allowed when the CMPE2 signal is "1". When the CMP2 signal becomes logical "1", a signal VENB2 from bit 1 of the register 1708 becomes a changeover signal (V-ENB2) which validates or invalidates the image. The image is validated when V-ENB2 is "1" and is invalidated when V-ENB2 is "0".

Figure 18:
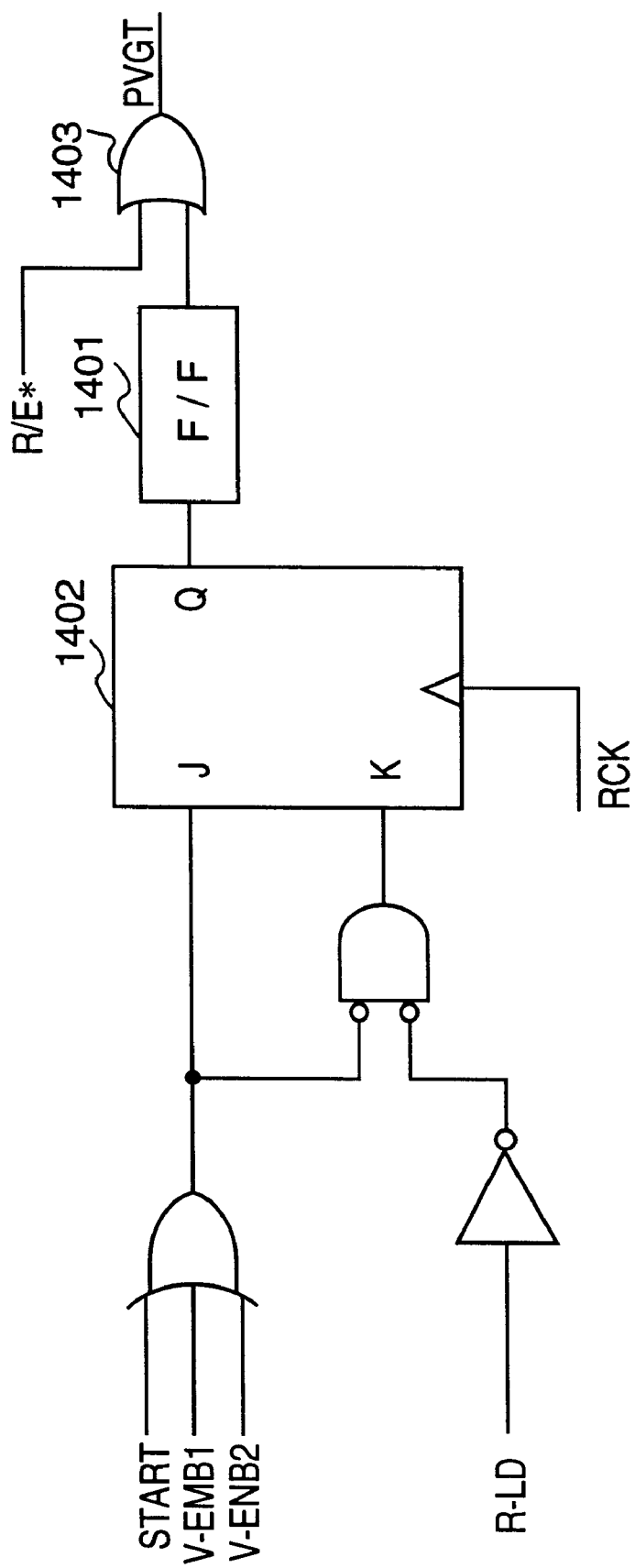
FIG. 18 is a block diagram illustrating the detailed architecture of an invalid-image controller shown in FIG. 14.

Further, the signals V-ENB1, V-ENB2, START, R-LD from the selection signal generator 1507 enter the invalid-image controller 1207 shown in FIG. 18. By way of example, when CMPE1 is "1", V-ENB1 is "1", the value set in the register 1301 is "10", CMPE2 is "1", V-ENB2 is "0" and the value set in the register 1302 is "3000", the PVGT signal from the invalid-image controller 1207 shown in FIG. 18 rises to logical "1" for read addresses of from "10" to "3000". As a result, the value of the image data VOUT for the interval of time over which the PVGT signal is "1" becomes logical "0" at the output of gate 1209 shown in FIG. 14. At this time the registers 1508 and 1509 shown in FIG. 19 are set to values that are larger by "1" than the set values in the registers 1701 and 1702 in the selection signal generator 1507. In other words, "11" and "3001" are set in the registers 1508 and 1509.

[Signal Selector (A) 1211]

Figure 24:
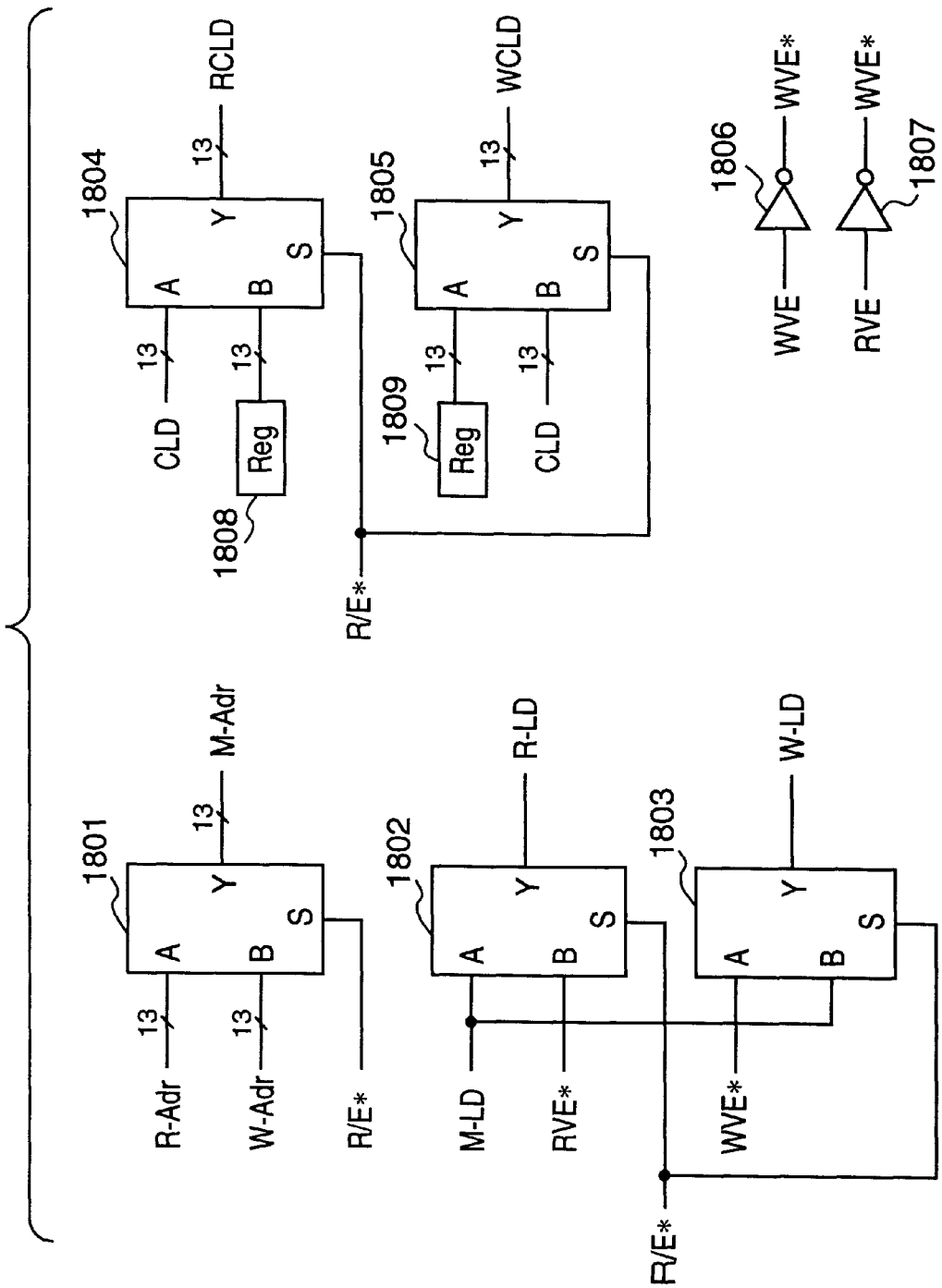
FIG. 24 is a block diagram illustrating the detailed architecture of a signal selector (A) shown in FIG. 14.

FIG. 24 is a block diagram illustrating the detailed architecture of the signal selector (A) 1211 shown in FIG. 14.

As shown in FIG. 24, the signal selector (A) 1211 includes selectors 1801, 1802, 1802, 1804 and 1805. When the input to the S terminal of these selectors is "0", the output terminal Y outputs the signal present at the A terminal. When the input to the S terminal is "1", the output terminal Y outputs the signal present at the B terminal. The signal selector (A) 1211 further includes 13-bit selectors 1801, 1804, 1805 and one-bit selectors 1802, 1803. The R/E* signal enters the S terminal of each of the selectors 1801, 1802, 1803, 1804, 1805. Inverters 1806, 1807 invert the signals WVE, RVE, respectively, thereby outputting signals WVE*, RVE*, respectively. Also provided are 13-bit registers 1808, 1809.

Thus, signals are selected in accordance with the logic shown in FIG. 25.

[Signal Selector (B) 1212]

Figures 26, 27:
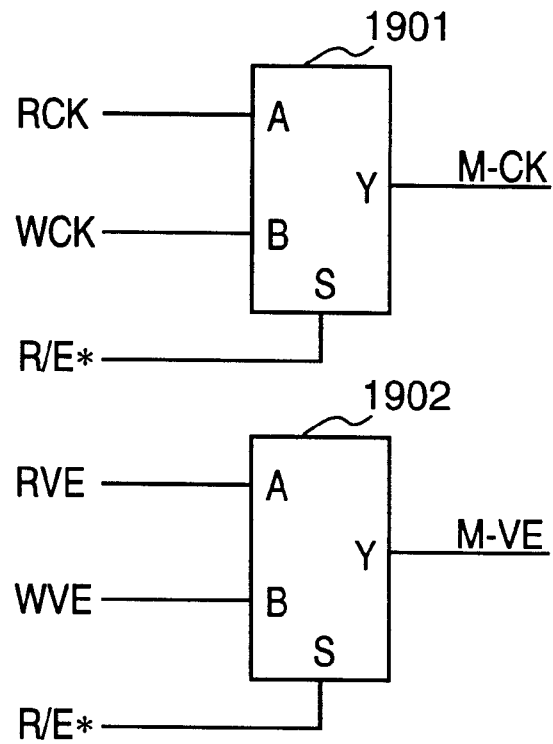
FIG. 26 is a block diagram illustrating the detailed architecture of a signal selector (B) shown in FIG. 14.
FIG. 27 is a block diagram illustrating selection logic of the signal selector (B) shown in FIG. 14.

FIG. 26 is a block diagram illustrating the detailed architecture of the signal selector (B) 1212 shown in FIG. 14.

As shown in FIG. 26, the signal selector (B) 1212 includes one-bit selectors 1901, 1902. When the input to the S terminal of these selectors is "0", the output terminal Y outputs the signal present at the A terminal. When the input to the S terminal is "1", the output terminal Y outputs the signal present at the B terminal. The R/E* signal enters the S terminal of each of the selectors 1901, 1902.

Thus, signals are selected in accordance with the logic shown in FIG. 27.

(Interpolator 1205)

Figure 28:
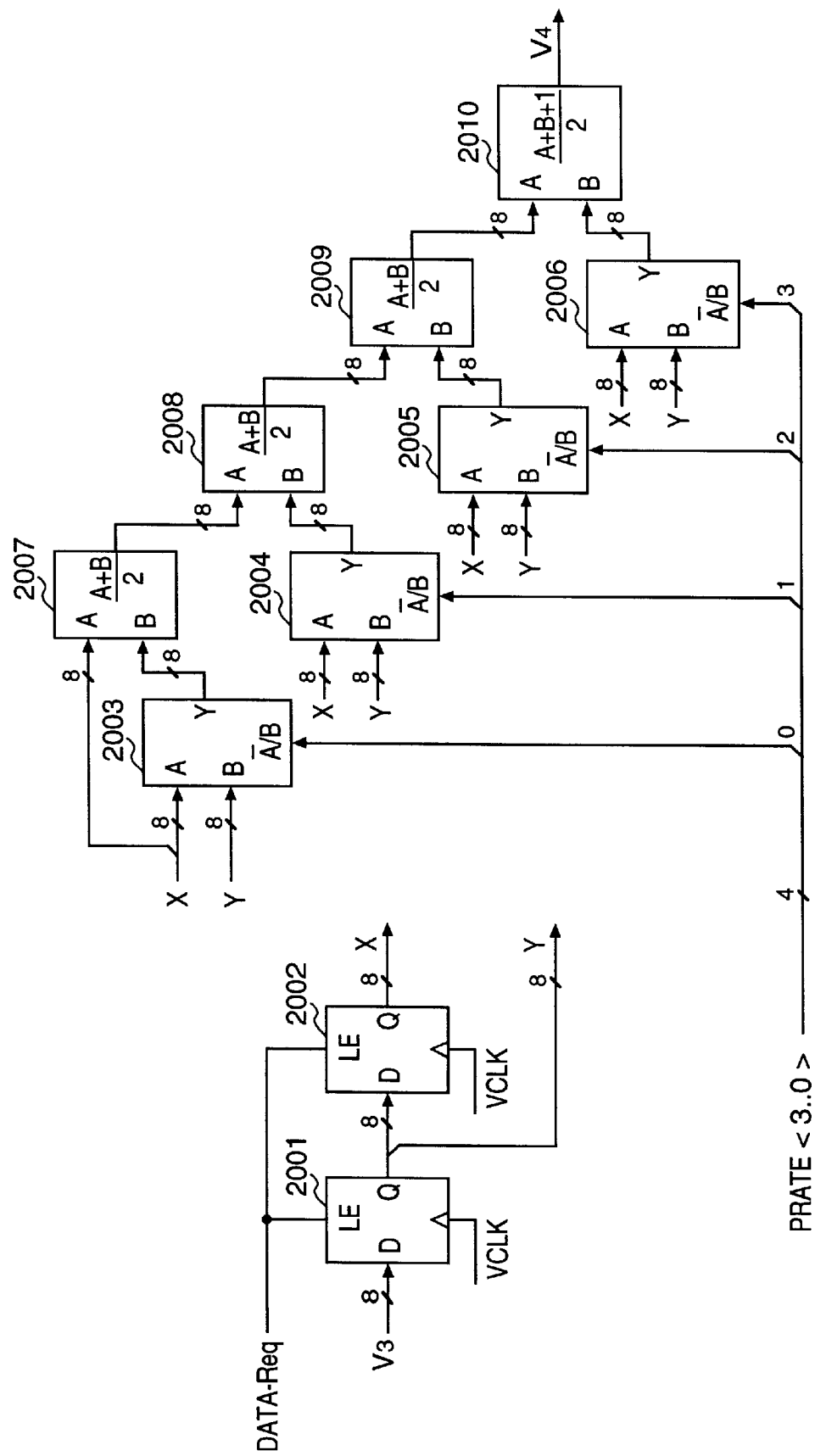
FIG. 28 is a block diagram illustrating the detailed architecture of a interpolator shown in FIG. 14.

FIG. 28 is a block diagram illustrating the detailed architecture of the interpolator 1205. The interpolator 1205 receives the four-bit interpolation rate PRATE <3 . . . 0> conforming to the zoom magnification from the interpolation rate generator 1206 shown in FIG. 14, performs linear interpolation of data between two pixels in accordance with the interpolation rate and outputs the interpolated value as V4.

As shown in FIG. 28, the interpolator 1205 includes selectors 2003, 2004, 2005 and 2006 controlled by respective bits of the interpolation rate PRATE <3 . . . 0>, and adders 2007, 2008, 2009 and 2010. The relationship between the input data to the A terminal and the input data to the B terminal of the adders 2007, 2008, 2009 and the output data is as follows:

output data=(A input data+B input data)/2

The relationship between input data to the A terminal and the input data to the B terminal of the adder 2010 and the output data V4 is as follows:

output data=(A input data+B input data+1)/2

Figure 29:
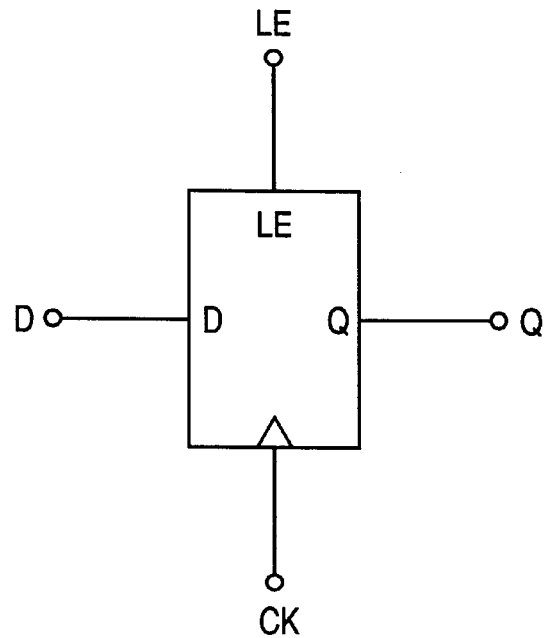
FIG. 29 is a diagram illustrating a latching flip-flop.
Figure 30:
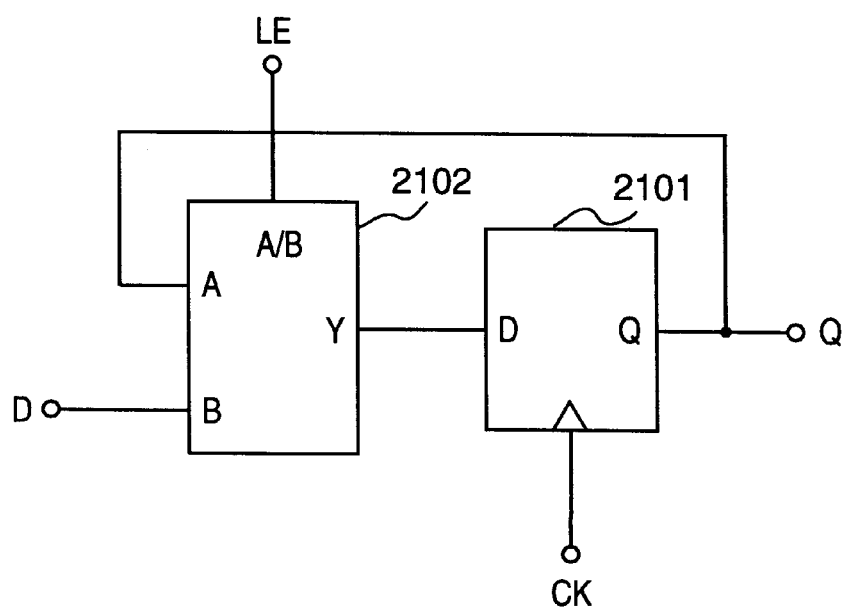
FIG. 30 is a diagram illustrating the details of the latching flip-flop shown in FIG. 29.

The data X, Y that enter each of the selectors and adders are data obtained by delaying the input data V3 from the selector 1204 in FIG. 14 by one clock and by two clocks. Shown at 2001, 2002 are flip-flops equipped with latches, illustrated in FIG. 29. More specifically, as shown in FIG. 30, these flip-flops are defined by a flip-flop 2101 and a selector 2102. That is, in FIG. 28, when a Data-Req signal becomes logical "1", new data indicative of V3 are outputted from the flip-flops 2001, 2002 at the rising edge of the signal VCLK. When the Data-Req signal is at logical "0", however, there is no change in the outputted data.

The relationship between V4 and the data X, Y and interpolation rate PRATE as the result of this circuit arrangement is as given by the following equation:

$$V4 = X \times (15 - \text{PRATE} + 1)/16 + Y \times (\text{PRATE})/16$$

(Interpolation Rate Generator 1206)

Figure 31:
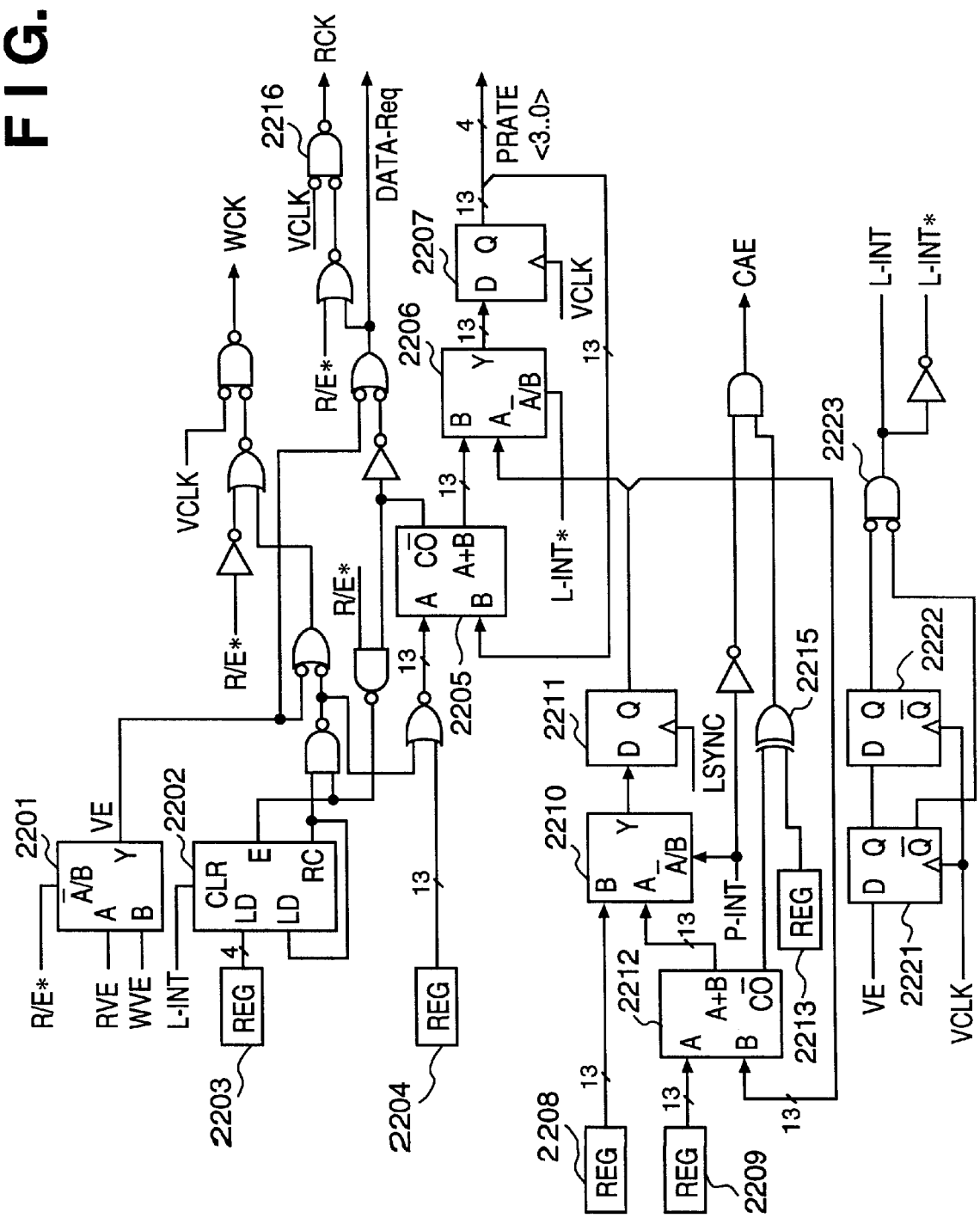
FIG. 31 is a block diagram illustrating the detailed architecture of an interpolation rate generator shown in FIG. 14.

FIG. 31 is a block diagram illustrating the detailed architecture of the interpolation rate generator 1206 for generating the four-bit interpolation rate PRATE <3 . . . 0>.

As shown in FIG. 31, the interpolation rate generator 1206 includes a selector 2201 which selects the WVE signal as a VE signal when the R/E* signal is logical "1" (i.e., when reduction or same-size copying is performed) and selects the RVE signal as the VE signal when the R/E* signal is logical "0".

A four-bit counter 2202 has a CLR terminal to which the L-INT signal, which is produced by the VE signal and VCLK signal, is applied. More specifically, at entry of the VE signal, the Q* output of a flip-flop 2221 and the Q output of a flip-flop 2222 become logical "0", as a result of which a gate 2223 outputs the L-INT signal. Accordingly, the L-INT signal is logical "1" for the initial pixel of one line. When "1" enters the CLR terminal of the four-bit counter 2202, the value of the count is initialized, the output of the RC terminal becomes logical "0" and the value in a register 2203 is set as the loaded value of counter 2202.

When a sum calculated by a 13-bit adder 2205 surpasses "8191", the output (carry signal) from the CO terminal of the adder becomes logical "1". When the carry signal becomes logical "1" in an interval in which the VE signal is "1", the Data-Req signal becomes logical "1", so that logical "1" enters the interpolator 1205 shown in FIG. 14. At this time a gate circuit 2216 outputs the RCK signal to the RAM-R/W unit 1203. In response to the RCK signal, therefore, image signal readout from the SRAMs 1308, 1307 of the RAM-R/W unit 1203 is performed at a timing that conforms to the zoom rate and zoom processing relating to the main-scan direction is executed.

A selector 2206 is controlled by the L-INT* signal, which becomes "0" for one pixel at the beginning of the line. The input to the A terminal is outputted when the L-INT* signal is "0" and the input to the B terminal is outputted when the L-INT* signal is "1".

Figures 32, 33:
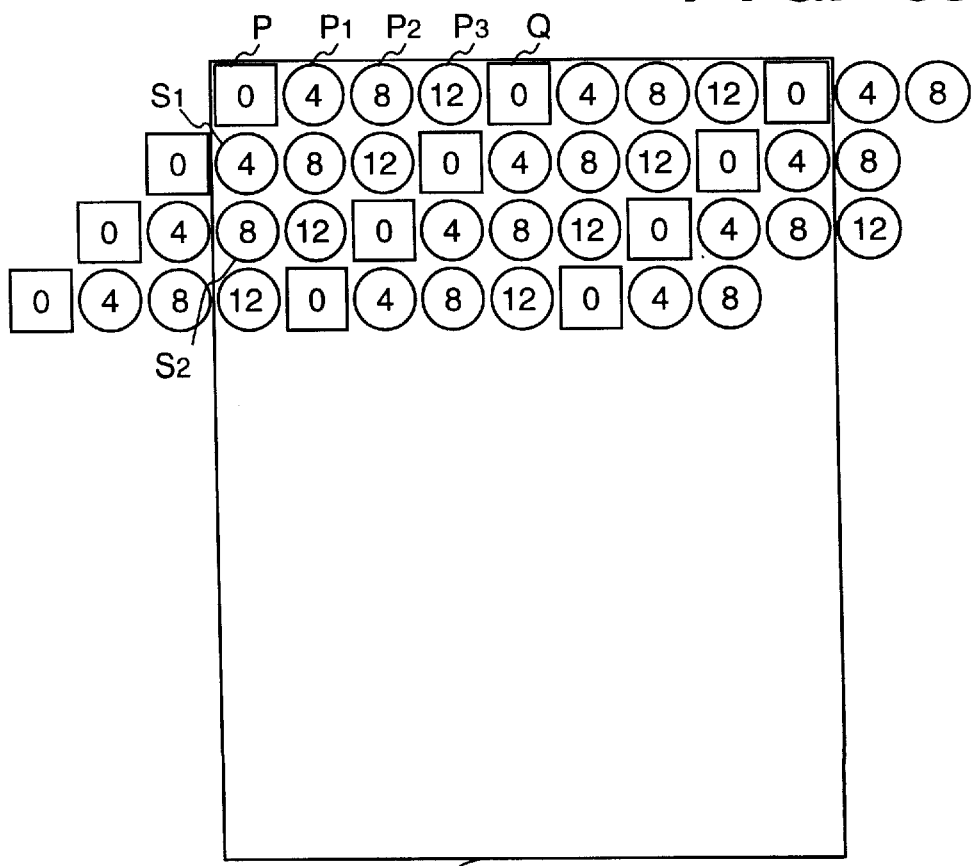
FIG. 32 is a diagram showing the relationship between a set value (X) and magnification (M%)
FIG. 33 is a diagram showing a change in the value of interpolation rate pixel by pixel.

FIG. 32 shows the relationship among the value (n) set in the register 2203, the value (X) set in the register 2204 and the magnification (M %) when reduction or same-size copying is performed. It should be noted that the relation $$M(\%)=819200/X$$

holds and the value (n) set in the register 2203 is "0" when enlargement is performed.

Further, the value in register 2208 is the initial value, for every line, of the interpolation rate PRATE <3 . . . 0), P-INT enters as the control input of selector 2210, and the value in register 2208 is outputted by the selector 2210 only for the initial page (sub-scan direction).

The value (OFST) in register 2209 is the offset value of the interpolation rate PRATE <3 . . . 0>. The relationship among OFST, magnification (M) and italicization angle (θ) is as follows:

$$OFST=819200/M(\%)\times\tan\theta$$

FIG. 33 is a diagram showing a change in the value of interpolation rate PRATE <3 . . . 0> pixel by pixel. The example shown in FIG. 33 is for a case where enlargement magnification (M) is 400% and italicization angle is 45°. The value (X) set in the register 2204 and the value of (OFST) in register 2209 are as indicated below. The value in register 2208 usually is fixed at "0".

$$X=819000/M(\%)=819200/400=2048$$

$$OFST=819200/M(\%)\times\tan\theta=819200/400\times\tan 45=2048$$

The effective image area in FIG. 33 is shown at 2301. The left edge of the area represents the beginning of a line, pixels indicated by squares represent pixels before enlargement, and pixels indicated by circles represent pixels obtained by interpolation for enlargement. Since this example is for 400% enlargement, FIG. 33 illustrates the manner in which three "circle" pixels are created for one "square" pixel to increase the number of pixels by four times. The numerals in the squares and circles represent the value of the interpolation rate PRATE <3 . . . 0> in decimal numbers.

First, since a pixel P is on the first page (sub-scan) of the image and on the first line (main scan), the control signal L-INT* of selector 2206 shown in FIG. 31 is "0", the input at the A terminal of this selector is selected, the control signal L-INT* of selector 2210 shown is "1", the input at the B terminal of this selector is selected and the interpolation rate of the pixel P is the value is register 2208, i.e., the initial value. This value is "0".

Next, the interpolation rate of a pixel P1 is the value of the four higher order bits of the value (2048) obtained by adding the value (X=2048) in register 2204 to the initial value using the adder 2205. Similarly, the interpolation rate of a pixel P2 is the value of the four higher order bits of the value (4096) obtained by adding the value (X=2048) in register 2204 to the output value (2048) (pixel P1) of flip-flop 2207 using the adder 2205. This value is "8". The interpolation rate thus changes and, when pixel Q is reached, the adder 2205 completes one cycle and its output returns to "0".

FIG. 34 is a diagram showing the relationship between the output value of the flip-flop 2207 and interpolation rate concerning each pixel.

If V(P) represents the image data of pixel P, V(Q) the image data of pixel Q and V(P1)~V(P3) the image data of the pixels P1~P3, respectively, then image data are generated from the interpolation rate PRATE <3 . . . 0> in the manner shown below. This operation is carried out by the interpolator of FIG. 28, as described above, and the image data produced as a result correspond to V4 shown in FIG. 28.

$$V(P)=V(P)\times 1+V(Q)\times 0=V(P)$$

$$V(P1)=V(P)\times(\tfrac{3}{4})+V(Q)\times(\tfrac{1}{4})$$

$$V(P2)=V(P)\times(\tfrac{1}{2})+V(Q)\times(\tfrac{1}{2})$$

$$V(P3)=V(P)\times(\tfrac{1}{42})+V(Q)\times(\tfrac{3}{4})$$

Next, pixel S1 shown in FIG. 33 is the starting pixel of the next line. Since P-INT is "0", the interpolation rate of this pixel is the value of the four higher order bits of the value (2048) obtained by adding the output value (0) (pixel P) of flip-flop 2211 and the value (OFST=2048) of register 2209 using the adder 2212. This value is "4". Similarly, the interpolation rate of a pixel S2 is the value of the four higher order bits of the value (4096) obtained by adding the output value (2048) (pixel S1) of flip-flop 2211 and the value (OFST=2048) of register 2209 using the adder 2212. This value is "8". The interpolation rates regarding each of the other pixels are decided in similar fashion.

Thus, the output of the adder 2212 is the initial value of the interpolation rate every line and the initial value of the interpolation rate changes line by line in steps of the value (OFST) in register 1209. Accordingly, at the time of italicization, it is possible to shift the interpolation rate <3 . . . 0> as well, in the same manner as the image, line by line in dependence upon the angle of italicization.

Further, when the sum calculated by the adder 2212 exceeds "8191", the output (carry signal) from its CO terminal goes to logical "1". When the carry signal becomes "1" in the interval in which the P-INT signal is "0", the CAE signal becomes "1". This logic enters the address load-value generator 1202 shown in FIG. 14.

A register 2213 is for controlling the polarity of the carrier signal from the adder 2212. If the value in register 2213 is "1", the polarity of the carry signal is inverted by an inverter 2215. This control is carried out in dependence upon the orientation of the angle of italicization.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing the program codes of the software for performing the aforesaid functions of the foregoing embodiment to a system or an apparatus, reading the program codes with a computer (e.g., a CPU or MPU) of the system or apparatus from the storage medium, and then executing the program.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, the present invention covers a case where an operating system (OS) or the like working on the computer performs a part of or the entire process in accordance with the designation of program codes and implements the functions according to the embodiment.

Furthermore, the present invention further covers a case where, after the program codes read from the storage medium are written to a function extension board inserted into the computer or to a memory provided in a function extension unit connected to the computer, a CPU or the like contained in the function extension board or function extension unit performs a part of or the entire process in accordance with the designation of program codes and implements the function of the above embodiments.

Thus, in accordance with the embodiments of the invention as described above, it is possible to obtain a high-quality image output, without jaggies, even in italicization processing accompanying zoom processing.

Furthermore, it is possible for an interpolating circuit to use, without modification, the circuitry employed in zoom processing. As a result, the invention can be realized without a major increase in cost.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   entering means for entering an image signal representing an image line by line;
   memory means;
   generating means for generating a write address of said memory means at which the image signal is written;
   first control means for controlling said generating means so as to gradually change a write starting address of said memory means, to which a line of the image signal is written, in dependence upon an amount of inclination and a zoom rate of the image;
   second control means for controlling said generating means so as to increase the write address from the write starting address by an increasing rate which depends on the zoom rate of the image; and
   output means for outputting the image signal from said memory means that represents the image that has undergone inclination processing and zoom processing.

2. The apparatus according to claim 1, wherein said first control means controls a changing rate of the write starting address in dependence upon the amount of inclination and the zoom rate of the image.

3. The apparatus according to claim 1, wherein said first control means controls said generating means so as to increase or decrease the write starting address in dependence upon the direction of inclination of the image.

4. An image processing apparatus comprising:
   entering means for entering an image signal representing an image line by line;
   memory means;
   generating means for generating a write address of said memory means at which the image signal is written and a readout address of said memory means at which the image signal is read out;
   first control means for controlling said generating means so as to gradually change the write starting address to which a line of the image signal is written, or to gradually change the readout starting address from which a line of the image signal is read out, in dependence upon the amount of inclination and the zoom rate of the image;
   second control means for controlling said generating means so as to increase the write address from the write starting address, or to increase the readout address from the readout starting address, by an increasing rate which depends on the zoom rate of the image; and
   output means for outputting the image signal from said memory means that represents the image that has undergone inclination processing and zoom processing.

5. The apparatus according to claim 4, wherein said first control means controls a changing rate of the write starting address or the readout starting address in dependence upon the amount of inclination and the zoom rate of the image.

6. The apparatus according to claim 4, wherein said first control means controls said generating means so as to increase or decrease the write starting address or the readout starting address in dependence upon the direction of inclination of the image.

7. The apparatus according to claim 4, wherein said first control means controls said generating means so as to change the readout starting address when the image is enlarged, and to change the write starting address when the image is reduced.

8. An image processing method comprising the steps of:
   entering an image signal representing an image line by line;
   generating a write address of a memory at which the image signal is written;
   gradually changing a write starting address of the memory, to which a line of the image signal is written, in dependence upon an amount of inclination and a zoom rate of the image;
   increasing the write address from the write starting address by an increasing rate which depends on the zoom rate of the image; and
   outputting the image signal from the memory that represents the image that has undergone inclination processing and zoom processing.

9. The method according to claim 8, wherein said step of changing changes the write starting address by a changing rate in dependence upon the amount of inclination and the zoom rate of the image.

10. The method according to claim 8, wherein said step of changing increases or decreases the write starting address in dependence upon the direction of inclination of the image.

11. An image processing method comprising the steps of:
    entering an image signal representing an image line by line;
    generating a write address of a memory at which the image signal is written and a readout address of the memory at which the image signal is read out;
    gradually changing the write starting address to which a line of the image signal is written, or the readout starting address from which a line of the image signal is read out, in dependence upon the amount of inclination and the zoom rate of the image;
    increasing the write address from the write starting address, or the readout address from the readout starting address, by an increasing rate which depends on the zoom rate of the image; and
    outputting the image signal from the memory that represents the image that has undergone inclination processing and zoom processing.

12. The method according to claim 11, wherein said step of changing the write starting address or the readout starting address in dependence upon the amount of inclination and the zoom rate of the image.

13. The method according to claim 11, wherein said step of changing increases or decreases the write starting address or the readout starting address in dependence upon the direction of inclination of the image.

14. The method according to claim 11, wherein the step of changing changes the readout starting address when the image is enlarged, and changes the write starting address when the image is reduced.

15. An image processing method comprising the steps of:

entering an image signal representing an image line by line;

generating a write address of a memory at which the image signal is written and a readout address of the memory at which the image signal is read out;

gradually changing the write starting address to which a line of the image signal is written when the image is reduced, and the readout starting address from which a line of image signal is read out when the image is enlarged, in dependence upon an amount of inclination and a zoom rate of the image;

increasing the write address from the write starting address by an increasing rate which depends on the zoom rate when the image is reduced, and the readout address from the readout starting address by an increasing rate which depends on the zoom rate when the image is enlarged; and outputting the image signal from the memory that represents the image that has undergone inclination processing and zoom processing.

16. The method according to claim 15, wherein said step of changing changes the write starting address or the readout starting address by a changing rate in dependence upon the amount of inclination and the zoom rate of the image.

17. The method according to claim 15, wherein said step of changing increases or decreases the write starting address or the readout starting address in dependence upon the direction of inclination of the image.

18. An image processing apparatus comprising:

entering means for entering an image signal representing an image line by line;

memory means;

generating means for generating a write address of said memory means at which the image signal is written and a readout address of said memory means at which the image signal is read out;

first control means for controlling said generating means in dependence upon an amount of inclination and a zoom rate of the image, so as to gradually change the write starting address to which a line of the image signal is written when the image is reduced, and to gradually change the readout starting address from which a line of image signal is read out when the image is enlarged;

second control means for controlling said generating means so as to increase the write address from the write starting address by an increasing rate which depends on the zoom rate when the image is reduced, and to increase the readout address from the readout starting address by an increasing rate which depends on the zoom rate when the image is enlarged; and output means for outputting the image signal from said memory means that represents the image that has undergone inclination processing and zoom processing.

19. The apparatus according to claim 18, wherein said first control means controls a changing rate of the write starting address or the readout starting address in dependence upon the amount of inclination and the zoom rate of the image.

20. The apparatus according to claim 18, wherein said first control means controls said generating means so as to increase or decrease the write starting address or the readout starting address in dependence upon the direction of inclination of the image.

* * * * *

UNITED STATES PATENT AND TRADEMARK OFFICE
CERTIFICATE OF CORRECTION

PATENT NO. : 6,137,921
DATED : October 24, 2000
INVENTOR(S) : Suzuki et al.

It is certified that error appears in the above-identified patent and that said Letters Patent is hereby corrected as shown below:

Column 2:
Line 15, "BOE* signal" should read -- a BOE* signal --; and
Line 61, "a interpolator" should read -- an interpolator --.

Column 3:
Line 14, "case" should read -- a case --.

Column 4:
Line 20, "to the formation" should read -- the formation --; and
Line 57, "This to" should read -- This is to --.

Column 5:
Line 61, "is enters" should read -- enters --.

Column 10:
Line 6, "signal" should read -- signals --.

Column 13:
Line 30, "1802, 1802," should read -- 1802, 1803 --.

Column 15:
Line 8, "<3 ... 0)," should read -- <3.. 0> --.

Signed and Sealed this

Thirteenth day of November, 2001

Attest:

NICHOLAS P. GODICI
Attesting Officer    Acting Director of the United States Patent and Trademark Office